(12) United States Patent
Röben et al.

(10) Patent No.: US 10,669,401 B2
(45) Date of Patent: Jun. 2, 2020

(54) PLASTIC-COATED MERCAPTOSILANE/WAX MIXTURE

(71) Applicants: Caren Röben, Köln (DE); Andrea Korch, Köln (DE); Sabine Leick, Bruchköbel (DE); Kathrin Kunowa, Joplin, MO (US); Juri Tschernjaew, Aschaffenburg (DE)

(72) Inventors: Caren Röben, Köln (DE); Andrea Korch, Köln (DE); Sabine Leick, Bruchköbel (DE); Kathrin Kunowa, Joplin, MO (US); Juri Tschernjaew, Aschaffenburg (DE)

(73) Assignee: EVONIK OPERATIONS GMBH, Essen (DE)

( * ) Notice: Subject to any disclaimer, the term of this patent is extended or adjusted under 35 U.S.C. 154(b) by 0 days.

(21) Appl. No.: 15/503,238

(22) PCT Filed: Apr. 23, 2015

(86) PCT No.: PCT/EP2015/058839
§ 371 (c)(1),
(2) Date: Feb. 10, 2017

(87) PCT Pub. No.: WO2016/023645
PCT Pub. Date: Feb. 18, 2016

(65) Prior Publication Data
US 2017/0233552 A1 Aug. 17, 2017

(30) Foreign Application Priority Data

Aug. 14, 2014 (EP) .................................... 14180912

(51) Int. Cl.
| | |
|---|---|
| *C08K 5/37* | (2006.01) |
| *C08K 5/541* | (2006.01) |
| *C08L 9/00* | (2006.01) |
| *C08L 9/06* | (2006.01) |
| *C08K 5/54* | (2006.01) |
| *C08L 23/06* | (2006.01) |
| *B60C 1/00* | (2006.01) |
| *C08K 5/548* | (2006.01) |
| *C08L 21/00* | (2006.01) |
| *C08J 3/20* | (2006.01) |
| *C08K 5/5415* | (2006.01) |
| *C08L 23/08* | (2006.01) |
| *C08L 23/10* | (2006.01) |
| *C08K 5/5419* | (2006.01) |
| *C08L 23/04* | (2006.01) |
| *C08K 5/372* | (2006.01) |
| *C08L 23/12* | (2006.01) |

(52) U.S. Cl.
CPC .................. *C08K 5/54* (2013.01); *B60C 1/00* (2013.01); *B60C 1/0016* (2013.01); *C08J 3/20* (2013.01); *C08K 5/548* (2013.01); *C08L 9/06* (2013.01); *C08L 21/00* (2013.01); *C08L 23/06* (2013.01); *C08J 2391/06* (2013.01); *C08K 5/37* (2013.01); *C08K 5/3725* (2013.01); *C08K 5/5415* (2013.01); *C08K 5/5419* (2013.01); *C08L 9/00* (2013.01); *C08L 23/04* (2013.01); *C08L 23/0853* (2013.01); *C08L 23/10* (2013.01); *C08L 23/12* (2013.01); *C08L 2207/06* (2013.01); *C08L 2666/02* (2013.01); *C08L 2666/44* (2013.01)

(58) Field of Classification Search
None
See application file for complete search history.

(56) References Cited

U.S. PATENT DOCUMENTS

| | | | |
|---|---|---|---|
| 4,877,663 A | * | 10/1989 | Kambe .................. C08J 5/18 428/35.5 |
| 7,078,551 B2 | | 7/2006 | Cruse et al. |
| 9,199,211 B2 | | 12/2015 | Tschernjaew et al. |
| 9,512,306 B2 | | 12/2016 | Peterle et al. |
| 2003/0083412 A1 | | 5/2003 | Luginsland et al. |

(Continued)

FOREIGN PATENT DOCUMENTS

| | | |
|---|---|---|
| CN | 1807434 A | 7/2006 |
| DE | 2209814 A1 | 9/1972 |

(Continued)

OTHER PUBLICATIONS

International Search Report for PCT/EP2015/058839, dated Jun. 29, 2015 in English and German Language.

(Continued)

*Primary Examiner* — Richard A Huhn
(74) *Attorney, Agent, or Firm* — Smith, Gambrell & Russell, LLP.

(57) ABSTRACT

The invention relates to a plastics-covered mercaptosilane-wax mixture, where the plastic of the plastics covering is selected from the group of polypropylene, polyethylene, ethylene-vinyl acetate copolymer and mixtures of the above-mentioned plastics with melting point from 70 to 170° C., and the mercaptosilane-wax mixture comprises at least one mercaptosilane of the general formula I

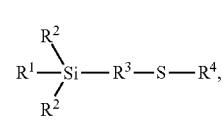

and at least one wax with congealing point from 30 to 160° C.

The plastics-covered mercaptosilane-wax mixture can be used in rubber mixtures.

9 Claims, No Drawings

(56) References Cited

U.S. PATENT DOCUMENTS

| | | |
|---|---|---|
| 2005/0004386 A1 | 1/2005 | Deschler et al. |
| 2006/0161015 A1* | 7/2006 | Klockmann .......... C07F 7/1836 556/427 |
| 2007/0203274 A1 | 8/2007 | Korth et al. |
| 2009/0326160 A1* | 12/2009 | Kimura .................. C08K 5/134 525/303 |
| 2011/0287205 A1 | 11/2011 | Klockmann et al. |
| 2015/0175782 A1 | 6/2015 | Blume et al. |
| 2015/0353734 A1 | 12/2015 | Peterle et al. |

FOREIGN PATENT DOCUMENTS

| | | |
|---|---|---|
| DE | 102013203651 A1 | 9/2014 |
| EP | 1285926 A1 | 2/2003 |
| EP | 1683801 A2 | 7/2006 |
| EP | 1829922 A1 | 9/2007 |
| JP | S47-3070748 A | 11/1972 |
| KR | 850000081 B1 | 2/1985 |
| WO | 2013149790 A1 | 10/2013 |

OTHER PUBLICATIONS

W. Hofmann, Kautschuktechnologie (Rubber Technology), Genter Verlag, Stuttgart 1980, Table of Contents (3 pages) and Chapter 3.3 Klassifizierung der Kautschuke—Rubber List—(3 pages).

Search Report for German Patent Application No. 14180912 dated Feb. 4, 2015 (7 pages in German with standard letter relevance classification).

\* cited by examiner

PLASTIC-COATED MERCAPTOSILANE/WAX MIXTURE

The invention relates to plastics-covered mercaptosilane-wax mixtures, processes for production of these, and also to use of these.

In the tyre industry sulphur silanes are sometimes used in order, in combination with silica, to improve rolling resistance, wet skid performance and abrasion resistance. The sulphur silanes normally used are liquid, and introduction of these therefore requires that the liquid silane be weighed out in advance and sealed within an enveloping material or that liquid is metered directly into the mixer. In order to avoid this type of complicated addition method, it is possible to absorb the sulphur silanes onto a carrier. The intention is that the carrier does not react with the sulphur silane, i.e. is chemically inert, in order that the entire amount of silane is available within the tyre mixture.

EP 1285926, EP 1683801 and EP 1829922 disclose mercaptosilanes or polysulphidic silanes having polyether groups. The silanes can also have been absorbed on an organic carrier.

Furthermore, KR 850000081 discloses silane/filler blends and WO 2013149790 discloses mercaptosilane/carbon black blends.

U.S. Pat. No. 7,078,551 moreover discloses blocked mercaptosilanes on a carrier.

DE 102013203651 discloses mercaptosilane-polymer mixtures.

The known mercaptosilane/carrier mixtures have a disadvantageous shelf life.

It is an object of the present invention to provide mercaptosilanes which have good shelf life and processability.

The invention provides a plastics-covered mercaptosilane-wax mixture which is characterized in that the plastic of the plastics covering is selected from the group of polypropylene, polyethylene, preferably LDPE, ethylene-vinyl acetate copolymer and mixtures of the abovementioned plastics with melting point from 70 to 170° C., preferably from 85 to 140° C., particularly preferably from 100 to 120° C., and the mercaptosilane-wax mixture comprises at least one mercaptosilane of the general formula I

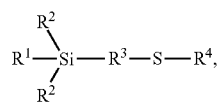

where $R^1$ is an alkyl polyether group $—O—(R^5—O)_m—R^6$, where $R^5$ is identical or different and is a branched or unbranched, saturated or unsaturated, aliphatic divalent C1-C30 hydrocarbon group, preferably $CH_2—CH_2$, $CH_2—CH(CH_3)$, $—CH(CH_3)—CH_2—$ or $CH_2—CH_2—CH_2$, m is on average from 1 to 30, preferably from 2 to 20, particularly preferably from 2 to 15, very particularly preferably from 3 to 10, extremely preferably from 3.5 to 7.9, and $R^6$ is composed of at least 1, preferably from 11 to 30, particularly preferably from 12 to 20, C atoms and is an unsubstituted or substituted, branched or unbranched monovalent alkyl, alkenyl, aryl or aralkyl group, $R^2$ is identical or different and is an $R^1$, C1-C12-alkyl or $R^7O$ group, where $R^7$ is H, methyl, ethyl, propyl, C9-C30 branched or unbranched monovalent alkyl, alkenyl, aryl, or aralkyl group or $(R^8)_3Si$ group, where $R^8$ is C1-C30 branched or unbranched alkyl or alkenyl group, $R^3$ is a branched or unbranched, saturated or unsaturated, aliphatic, aromatic or mixed aliphatic/aromatic divalent C1-C30, preferably C1-C6, particularly preferably C3, hydrocarbon group and $R^4$ is H, CN or $(C{=}O)—R^9$, where $R^9$ is a branched or unbranched, saturated or unsaturated, aliphatic, aromatic or mixed aliphatic/aromatic monovalent C1-C30, preferably C5 to C30, particularly preferably C5 to C20, very particularly preferably C7 to C15, extremely preferably C7 to C11, hydrocarbon group, and at least one wax, preferably paraffinic wax, particularly preferably a mixture of different paraffinic waxes, with particular preference a mixture or n- and iso-paraffinic waxes, with congealing point from 30 to 160° C., preferably from 40 to 130° C., particularly preferably from 60 to 80° C.

The melting point of the plastic is determined in accordance with ISO 3146:2000.

The congealing point of the wax is determined in accordance with DIN ISO 2207.

The plastics covering can comprise >90% by weight of plastic, preferably ≥95% by weight, particularly preferably >97% by weight. The plastics covering can be composed of polypropylene, polyethylene, preferably LDPE, ethylene-vinyl acetate copolymer of a mixture of the abovementioned plastics.

The plastics covering can cover the mercaptosilane-wax mixture entirely.

The plastics covering can preferably be a plastics sachet.

The glass transition temperature of the plastic can be from −80 to +10° C. Particularly preferred glass transition temperatures can be: ethylene-vinyl acetate from −30 to −10° C., polyethylene from −100 to −20° C. and polypropylene from −30 to +10° C.

Glass transition temperature can be determined in accordance with DIN EN ISO 11357-2.

The average molar mass of the plastic can be from 50 000 to 1 000 000 g/mol, preferably from 80 000 to 500 000 g/mol, particularly preferably from 100 000 to 250 000 g/mol. Average molar mass can be determined in accordance with DIN EN ISO 16014-5.

The melt flow rate (MFR) of the plastic can be from 0.2 to 30 g/10 min (DIN EN ISO 1133: 190° C./2.16 kg). Particularly preferred melt flow rates can be: ethylene-vinyl acetate from 0.4 to 1.0 g/10 min, polyethylene from 1.0 to 5.0 g/10 min and polypropylene from 20 to 30 g/10 min.

The ethylene-vinyl acetate copolymer is a copolymer of vinyl acetate and ethylene and can comprise from 4 to 30% by weight, preferably from 4.3 to 6.7% by weight, of vinyl acetate (DIN EN ISO 4613-2).

The polyethylene plastic can be HDPE or LDPE. The melting point of the LDPE plastic can be from 105° C. to 130° C. The melting point of the HDPE plastic can be from 125° C. to 150° C. The melting point of the polypropylene plastic (PP) can be from 140 to 170° C., and the melting point of the ethylene-vinyl acetate copolymer can be from 70° C. to 125° C.

The polyethylene plastic can be an LDPE with density from 0.915 to 0.935 g/cm³ or an HDPE with density from 0.94 to 0.97 g/cm³. The density of the polypropylene can be from 0.895 to 0.92 g/cm³. The density of the ethylene-vinyl acetate copolymer can be from 0.92 to 1.0 g/cm³. The density of the plastic can be determined in accordance with DIN EN ISO 1183.

The thickness of the plastics covering, preferably the plastics sachet, can be from 10 to 3000 μm, preferably from 40 to 1000 μm, particularly preferably from 100 to 250 μm.

The water-vapour transmission of the plastics covering, preferably plastics sachet, can be less than 10 g/(m²d), preferably less than 5 g/(m²d), particularly preferably less than 1 g/(m²d), at 85% r.h. and 23° C. The oxygen transmission of the plastics covering, preferably plastics sachet, can be less than 15 000 cm³/(m² d bar), preferably less than 10 000 cm³/(m² d bar), particularly preferably less than 3000 cm³/(m² d bar), at 85% r.h. and 25° C.

Water-vapour transmission can be determined in accordance with DIN 53122-2.

Oxygen transmission can be determined in accordance with DIN 53380-2.

The mercaptosilane-wax mixture can comprise, based on the mercaptosilane-wax mixture, at least 10% by weight, preferably at least 40% by weight, particularly preferably from 70% to 95% by weight, very particularly preferably from 80 to 85% by weight, of mercaptosilane of the general formula I.

The ratio by weight of mercaptosilane of the general formula I to wax can be from 10:90 to 95:5, preferably from 55:45 to 90:10, particularly preferably from 80:20 to 85:15.

The needle penetration of the wax used can be from 14 to 26¹/₁₀ mm, preferably from 15 to 20¹/₁₀ mm at 25° C.

Needle penetration can be measured in accordance with DIN 51579.

The mixture of n- and iso-paraffinic waxes may have a weight ratio of n- to iso-paraffinic waxes of 30:70 to 80:20, preferably 40:60 to 75:25, more preferably 50:50 to 70:30. The weight ratio of n- to isoparaffinic waxes can be determined by means of gas chromatography to ASTM D 5442.

The wax, preferably paraffinic wax, may have a molecular weight $M_w$ of 250-800 g/mol, preferably 350-700 g/mol, more preferably 400-600 g/mol. The molecular weight $M_w$ of the wax can be determined by means of gas chromatography to ASTM D 5442.

The mercaptosilanes of the general formula I can be compounds where $R^1$ is an alkyl polyether group —O—$(R^5$—O$)_m$—$R^6$, where $R^5$ is identical or different and is a branched or unbranched, saturated or unsaturated, aliphatic divalent C1-C30 hydrocarbon group, m is on average from 1 to 30, and $R^6$ is composed of at least 11 C atoms and is an unsubstituted or substituted, branched or unbranched monovalent alkyl, alkenyl, aryl or aralkyl group, $R^2$ is identical and is a C1-C12-alkyl or $R^7$O group, where $R^7$ is H, ethyl, propyl, C9-C30 branched or unbranched monovalent alkyl, alkenyl, aryl, or aralkyl group or $(R^8)_3$Si group, where $R^8$ is C1-C30 branched or unbranched alkyl or alkenyl group, $R^3$ is a branched or unbranched, saturated or unsaturated, aliphatic, aromatic or mixed aliphatic/aromatic divalent C1-C30 hydrocarbon group and $R^4$ is H, CN or (C=O)—$R^9$, where $R^9$ is a branched or unbranched, saturated or unsaturated, aliphatic, aromatic or mixed aliphatic/aromatic monovalent C1-C30 hydrocarbon group.

The mercaptosilanes of the general formula E can be compounds where $R^1$ is
—O—$(C_2H_4$—O$)_5$—$C_{11}H_{23}$, —O—$(C_2H_4$—O$)_5$—$C_{12}H_{25}$,
—O—$(C_2H_4$—O$)_5$—$C_{13}H_{27}$, —O—$(C_2H_4$—O$)_5$—$C_{14}H_{29}$,
—O—$(C_2H_4$—O$)_5$—$C_{15}H_{31}$, —O—$(C_2H_4$—O$)_3$—$C_{13}H_{27}$,
—O—$(C_2H_4$—O$)_4$—$C_{13}H_{27}$, —O—$(C_2H_4$—O$)_6$—$C_{13}H_{27}$,
—O—$(C_2H_4$—O$)_7$—$C_{13}H_{27}$—, —O—$(CH_2CH_2$—O$)_5$—$(CH_2)_{10}CH_3$, —O—$(CH_2CH_2$—O$)_5$—$(CH_2)_{11}CH_3$, —O—$(CH_2CH_2$—O$)_5$—$(CH_2)_{12}CH_3$, —O—$(CH_2CH_2$—O$)_5$—$(CH_2)_{13}CH_3$, —O—$(CH_2CH_2$—O$)_5$—$(CH_2)_{14}CH_3$, —O—$(CH_2CH_2$—O$)_3$—$(CH_2)_{12}CH_3$, —O—$(CH_2CH_2$—O$)_4$—$(CH_2)_{12}CH_3$, —O—$(CH_2CH_2$—O$)_6$—$(CH_2)_{12}CH_3$, —O—$(CH_2CH_2$—O$)_2$—$(CH_2)_{12}CH_3$,

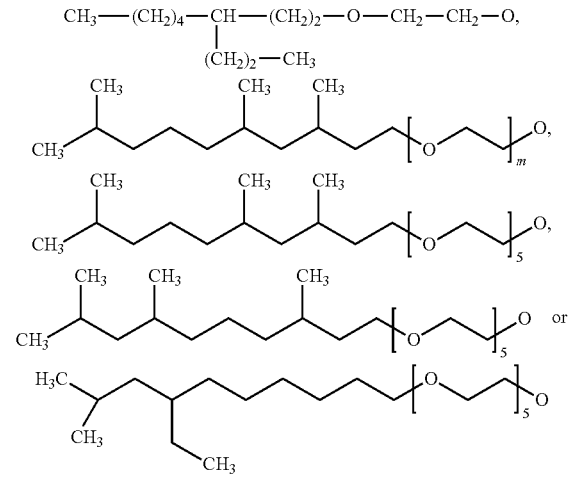

$R^2$ is different and is an $R^1$-, C1-C12-alkyl or $R^7$O group, where $R^7$ is H, methyl, ethyl, propyl, C9-C30 branched or unbranched monovalent alkyl, alkenyl, aryl, aralkyl group or $(R^8)_3$Si group, where $R^8$ is C1-C30 branched or unbranched alkyl or alkenyl group, $R^3$ is a branched or unbranched, saturated or unsaturated, aliphatic, aromatic or mixed aliphatic/aromatic divalent C1-C30 hydrocarbon group and $R^4$ is H, CN or (C=O)—$R^9$, where $R^9$ is a branched or unbranched, saturated or unsaturated, aliphatic, aromatic or mixed aliphatic/aromatic monovalent C1-C30 hydrocarbon group.

The mercaptosilanes of the general formula I can be compounds where $R^1$ is
—O—$(C_2H_4$—O$)_5$—$C_{11}H_{23}$, —O—$(C_2H_4$—O$)_5$—$C_{12}H_{25}$,
—O—$(C_2H_4$—O$)_5$—$C_{13}H_{27}$, —O—$(C_2H_4$—O$)_5$—$C_{14}H_{29}$,
—O—$(C_2H_4$—O$)_5$—$C_{15}H_{31}$, —O—$(C_2H_4$—O$)_3$—$C_{13}H_{27}$,
—O—$(C_2H_4$—O$)_4$—$C_{13}H_{27}$, —O—$(C_2H_4$—O$)_6$—$C_{13}H_{27}$,
—O—$(C_2H_4$—O$)_7$—$C_{13}H_{27}$, —O—$(CH_2CH_2$—O$)_5$—$(CH_2)_{10}CH_3$, —O—$(CH_2CH_2$—O$)_5$—$(CH_2)_{11}CH_3$, —O—$(CH_2CH_2$—O$)_5$—$(CH_2)_{12}CH_3$, —O—$(CH_2CH_2$—O$)_5$—$(CH_2)_{13}CH_3$, —O—$(CH_2CH_2$—O$)_5$—$(CH_2)_{14}CH_3$, —O—$(CH_2CH_2$—O$)_3$—$(CH_2)_{12}CH_3$, —O—$(CH_2CH_2$—O$)_4$—$(CH_2)_{12}CH_3$, —O—$(CH_2CH_2$—O$)_6$—$(CH_2)_{12}CH_3$, —O—$(CH_2CH_2$—O$)_7$—$(CH_2)_{12}CH_3$,

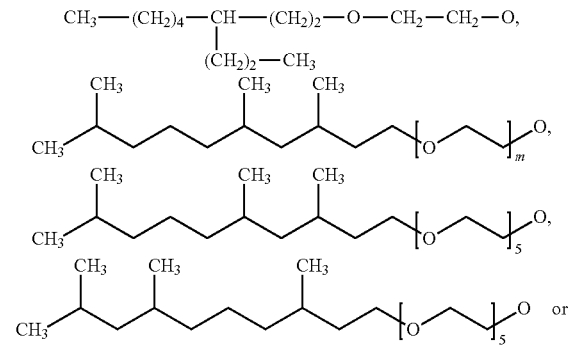

-continued $H_3C\text{-CH}(CH_3)\text{-CH}_2\text{-CH}(C_2H_5\text{-}CH_3)\text{-}(CH_2)_6\text{-}(O\text{-CH}_2\text{-CH}_2)_5\text{-}O\text{-}$ $R^2$ is an $R^1$ group,
$R^3$ is a branched or unbranched, saturated or unsaturated, aliphatic, aromatic or mixed aliphatic/aromatic divalent C1-C30 hydrocarbon group and
$R^4$ is H, CN or (C=O)—$R^9$, where $R^9$ is a branched or unbranched, saturated or unsaturated, aliphatic, aromatic or mixed aliphatic/aromatic monovalent C1-C30 hydrocarbon group.

Preferred compounds of the formula I where $R^4$=H can be:

$[(C_{11}H_{23}O—(CH_2—CH_2O)_2](EtO)_2Si(CH_2)_3SH$,
$[(C_{11}H_{23}O—(CH_2—CH_2O)_3](EtO)_2Si(CH_2)_3SH$,
$[(C_{11}H_{23}O—(CH_2—CH_2O)_4](EtO)_2Si(CH_2)_3SH$,
$[(C_{11}H_{23}O—(CH_2—CH_2O)_5](EtO)_2Si(CH_2)_3SH$,
$[(C_{11}H_{23}O—(CH_2—CH_2O)_6](EtO)_2Si(CH_2)_3SH$,
$[(C_{12}H_{25}O—(CH_2—CH_2O)_2](EtO)_2Si(CH_2)_3SH$,
$[(C_{12}H_{25}O—(CH_2—CH_2O)_3](EtO)_2Si(CH_2)_3SH$,
$[(C_{12}H_{25}O—(CH_2—CH_2O)_4](EtO)_2Si(CH_2)_3SH$,
$[(C_{12}H_{25}O—(CH_2—CH_2O)_5](EtO)_2Si(CH_2)_3SH$,
$[C_{12}H_{25}O—(CH_2—CH_2O)_6](EtO)_2Si(CH_2)_3SH$,
$[(C_{13}H_{27}O—(CH_2—CH_2O)_2](EtO)_2Si(CH_2)_3SH$,
$[(C_{13}H_{27}O—(CH_2—CH_2O)_3](EtO)_2—Si(CH_2)_3SH$,
$[(C_{13}H_{27}O—(CH_2—CH_2O)_4](EtO)_2Si(CH_2)_3SH$,
$[(C_{13}H_{27}O—(CH_2—CH_2O)_5](EtO)_2Si(CH_2)_3SH$,
$[(C_{13}H_{27}O—(CH_2—CH_2O)_6](EtO)_2Si(CH_2)_3SH$,
$[(C_{14}H_{29}O—(CH_2—CH_2O)_2](EtO)_2Si(CH_2)_3SH$,
$[(C_{14}H_{29}O—(CH_2—CH_2O)_3](EtO)_2Si(CH_2)_3SH$,
$[(C_{14}H_{29}O—(CH_2—CH_2O)_4](EtO)_2Si(CH_2)_3SH$,
$[(C_{14}H_{29}O—(CH_2—CH_2O)_5](EtO)_2Si(CH_2)_3SH$,
$[(C_{14}H_{29}O—(CH_2—CH_2O)_6](EtO)_2Si(CH_2)_3SH$,
$[(C_{15}H_{31}O—(CH_2—CH_2O)_2](EtO)_2Si(CH_2)_3SH$,
$[(C_{15}H_{31}O—(CH_2—CH_2O)_3](EtO)_2Si(CH_2)_3SH$,
$[(C_{15}H_{31}O—(CH_2—CH_2O)_4](EtO)_2Si(CH_2)_3SH$,
$[(C_{15}H_{31}O—(CH_2—CH_2O)_5](EtO)_2Si(CH_2)_3SH$,
$[(C_{15}H_{31}O—(CH_2—CH_2O)_6](EtO)_2Si(CH_2)_3SH$,
$[(C_{16}H_{33}O—(CH_2—CH_2O)_2](EtO)_2Si(CH_2)_3SH$,
$[(C_{16}H_{33}O—(CH_2—CH_2O)_3](EtO)_2Si(CH_2)_3SH$,
$[(C_{16}H_{33}O—(CH_2—CH_2O)_4](EtO)_2Si(CH_2)_3SH$,
$[(C_{16}H_{33}O—(CH_2—CH_2O)_5](EtO)_2Si(CH_2)_3SH$,
$[(C_{16}H_{33}O—(CH_2—CH_2O)_6](EtO)_2Si(CH_2)_3SH$,
$[(C_{17}H_{35}O—(CH_2—CH_2O)_2](EtO)_2Si(CH_2)_3SH$,
$[(C_{17}H_{35}O—(CH_2—CH_2O)_3](EtO)_2Si(CH_2)_3SH$,
$[(C_{17}H_{35}O—(CH_2—CH_2O)_4](EtO)_2Si(CH_2)_3SH$,
$[(C_{17}H_{35}O—(CH_2—CH_2O)_5](EtO)_2Si(CH_2)_3SH$,
$[(C_{17}H_{35}O—(CH_2—CH_2O)_6](EtO)_2Si(CH_2)_3SH$,
$[(C_{11}H_{23}O—(CH_2—CH_2O)_2]_2(EtO)Si(CH_2)_3SH$,
$[(C_{11}H_{23}O—(CH_2—CH_2O)_3]_2(EtO)Si(CH_2)_3SH$,
$[(C_{11}H_{23}O—(CH_2—CH_2O)_4]_2(EtO)Si(CH_2)_3SH$,
$[(C_{11}H_{23}O—(CH_2—CH_2O)_5]_2(EtO)Si(CH_2)_3SH$,
$[(C_{11}H_{23}O—(CH_2—CH_2O)_6]_2(EtO)Si(CH_2)_3SH$,
$[(C_{12}H_{25}O—(CH_2—CH_2O)_2]_2(EtO)Si(CH_2)_3SH$,
$[(C_{12}H_{25}O—(CH_2—CH_2O)_3]_2(EtO)Si(CH_2)_3SH$,
$[(C_{12}H_{25}O—(CH_2—CH_2O)_4]_2(EtO)Si(CH_2)_3SH$,
$[(C_{12}H_{25}O—(CH_2—CH_2O)_5]_2(EtO)Si(CH_2)_3SH$,
$[(C_{12}H_{25}O—(CH_2—CH_2O)_6]_2(EtO)Si(CH_2)_3SH$,
$[(C_{13}H_{27}O—(CH_2—CH_2O)_2]_2(EtO)Si(CH_2)_3SH$,
$[(C_{13}H_{27}O—(CH_2—CH_2O)_3]_2(EtO)Si(CH_2)_3SH$,
$[(C_{13}H_{27}O—(CH_2—CH_2O)_4]_2(EtO)Si(CH_2)_3SH$,
$[(C_{13}H_{27}O—(CH_2—CH_2O)_5]_2(EtO)Si(CH_2)_3SH$,
$[(C_{13}H_{27}O—(CH_2—CH_2O)_6]_2(EtO)Si(CH_2)_3SH$,
$[(C_{14}H_{29}O—(CH_2—CH_2O)_2]_2(EtO)Si(CH_2)_3SH$,
$[(C_{14}H_{29}O—(CH_2—CH_2O)_3]_2(EtO)Si(CH_2)_3SH$,
$[(C_{14}H_{29}O—(CH_2—CH_2O)_4]_2(EtO)Si(CH_2)_3SH$,
$[(C_{14}H_{29}O—(CH_2—CH_2O)_5]_2(EtO)Si(CH_2)_3SH$,
$[(C_{14}H_{29}O—(CH_2—CH_2O)_6]_2(EtO)Si(CH_2)_3SH$,
$[(C_{15}H_{31}O—(CH_2—CH_2O)_2]_2(EtO)Si(CH_2)_3SH$,
$[(C_{15}H_{31}O—(CH_2—CH_2O)_3]_2(EtO)Si(CH_2)_3SH$,
$[(C_{15}H_{31}O—(CH_2—CH_2O)_4]_2(EtO)Si(CH_2)_3SH$,
$[(C_{15}H_{31}O—(CH_2—CH_2O)_5]_2(EtO)Si(CH_2)_3SH$,
$[(C_{15}H_{31}O—(CH_2—CH_2O)_6]_2(EtO)Si(CH_2)_3SH$,
$[(C_{16}H_{33}O—(CH_2—CH_2O)_2]_2(EtO)Si(CH_2)_3SH$,
$[(C_{16}H_{33}O—(CH_2—CH_2O)_3]_2(EtO)Si(CH_2)_3SH$,
$[(C_{16}H_{33}O—(CH_2—CH_2O)_4]_2(EtO)Si(CH_2)_3SH$,
$[(C_{16}H_{33}O—(CH_2—CH_2O)_5]_2(EtO)Si(CH_2)_3SH$,
$[(C_{16}H_{33}O—(CH_2—CH_2O)_6]_2(EtO)Si(CH_2)_3SH$,
$[(C_{17}H_{35}O—(CH_2—CH_2O)_2]_2(EtO)Si(CH_2)_3SH$,
$[(C_{17}H_{35}O—(CH_2—CH_2O)_3]_2(EtO)Si(CH_2)_3SH$,
$[(C_{17}H_{35}O—(CH_2—CH_2O)_4]_2(EtO)Si(CH_2)_3SH$,
$[(C_{17}H_{35}O—(CH_2—CH_2O)_5]_2(EtO)Si(CH_2)_3SH$,
$[(C_{17}H_{35}O—(CH_2—CH_2O)_6]_2(EtO)Si(CH_2)_3SH$,
$[(C_{11}H_{23}O—(CH_2—CH_2O)_2]_3(EtO)Si(CH_2)_3SH$,
$[(C_{11}H_{23}O—(CH_2—CH_2O)_3]_3(EtO)Si(CH_2)_3SH$,
$[(C_{11}H_{23}O—(CH_2—CH_2O)_4]_3(EtO)Si(CH_2)_3SH$,
$[(C_{11}H_{23}O—(CH_2—CH_2O)_5]_3(EtO)Si(CH_2)_3SH$,
$[(C_{11}H_{23}O—(CH_2—CH_2O)_6]_3(EtO)Si(CH_2)_3SH$,
$[(C_{12}H_{25}O—(CH_2—CH_2O)_2]_3(EtO)Si(CH_2)_3SH$,
$[(C_{12}H_{25}O—(CH_2—CH_2O)_3]_3(EtO)Si(CH_2)_3SH$,
$[(C_{12}H_{25}O—(CH_2—CH_2O)_4]_3(EtO)Si(CH_2)_3SH$,
$[(C_{12}H_{25}O—(CH_2—CH_2O)_5]_3(EtO)Si(CH_2)_3SH$,
$[(C_{12}H_{25}O—(CH_2—CH_2O)_6]_3(EtO)Si(CH_2)_3SH$,
$[(C_{13}H_{27}O—(CH_2—CH_2O)_2]_3(EtO)Si(CH_2)_3SH$,
$[(C_{13}H_{27}O—(CH_2—CH_2O)_3]_3(EtO)Si(CH_2)_3SH$,
$[(C_{13}H_{27}O—(CH_2—CH_2O)_4]_3(EtO)Si(CH_2)_3SH$,
$[(C_{13}H_{27}O—(CH_2—CH_2O)_5]_3(EtO)Si(CH_2)_3SH$,
$[(C_{13}H_{27}O—(CH_2—CH_2O)_6]_3(EtO)Si(CH_2)_3SH$,
$[(C_{14}H_{29}O—(CH_2—CH_2O)_2]_3(EtO)Si(CH_2)_3SH$,
$[(C_{14}H_{29}O—(CH_2—CH_2O)_3]_3(EtO)Si(CH_2)_3SH$,
$[(C_{14}H_{29}O—(CH_2—CH_2O)_4]_3(EtO)Si(CH_2)_3SH$,
$[(C_{14}H_{29}O—(CH_2—CH_2O)_5]_3(EtO)Si(CH_2)_3SH$,
$[(C_{14}H_{29}O—(CH_2—CH_2O)_6]_3(EtO)Si(CH_2)_3SH$,
$[(C_{15}H_{31}O—(CH_2—CH_2O)_2]_3(EtO)Si(CH_2)_3SH$,
$[(C_{15}H_{31}O—(CH_2—CH_2O)_3]_3(EtO)Si(CH_2)_3SH$,
$[(C_{15}H_{31}O—(CH_2—CH_2O)_4]_3(EtO)Si(CH_2)_3SH$,
$[(C_{15}H_{31}O—(CH_2—CH_2O)_5]_3(EtO)Si(CH_2)_3SH$,
$[(C_{15}H_{31}O—(CH_2—CH_2O)_6]_3(EtO)Si(CH_2)_3SH$,
$[(C_{16}H_{33}O—(CH_2—CH_2O)_2]_3(EtO)Si(CH_2)_3SH$,
$[(C_{16}H_{33}O—(CH_2—CH_2O)_3]_3(EtO)Si(CH_2)_3SH$,
$[(C_{16}H_{33}O—(CH_2—CH_2O)_4]_3(EtO)Si(CH_2)_3SH$,
$[(C_{16}H_{33}O—(CH_2—CH_2O)_5]_3(EtO)Si(CH_2)_3SH$,
$[(C_{16}H_{33}O—(CH_2—CH_2O)_6]_3(EtO)Si(CH_2)_3SH$,
$[(C_{17}H_{35}O—(CH_2—CH_2O)_2]_3(EtO)Si(CH_2)_3SH$,
$[(C_{17}H_{35}—(CH_2—CH_2O)_3]_3(EtO)Si(CH_2)_3SH$,
$[(C_{17}H_{35}O—(CH_2—CH_2O)_4]_3(EtO)Si(CH_2)_3SH$,
$[(C_{17}H_{35}O—(CH_2—CH_2O)_5]_3(EtO)Si(CH_2)_3SH$,
$[(C_{17}H_{35}O—(CH_2—CH_2O)_6]_3(EtO)Si(CH_2)_3SH$,
$[(C_{11}H_{23}O—(CH_2—CH_2O)_2](EtO)_2Si—CH_2—CH(CH_3)—CH_2—SH$,
$[(C_{11}H_{23}O—(CH_2—CH_2O)_3](EtO)_2Si—CH_2—CH(CH_3)—CH_2—SH$,
$[(C_{11}H_{23}O—(CH_2—CH_2O)_4](EtO)_2Si—CH_2—CH(CH_3)—CH_2—SH$,
$[(C_{11}H_{23}O—(CH_2—CH_2O)_5](EtO)_2Si—CH_2—CH(CH_3)—CH_2—SH$,
$[(C_{11}H_{23}O—(CH_2—CH_2O)_6](EtO)_2Si—CH_2—CH(CH_3)—CH_2—SH$,
$[(C_{12}H_{25}O—(CH_2—CH_2O)_2](EtO)_2Si—CH_2—CH(CH_3)—CH_2—SH$, $[(C_{12}H_{25}O—(CH_2—CH_2O)_3](EtO)_2Si—CH_2—CH(CH_3)—CH_2—SH$,
$[(C_{12}H_{25}O—(CH_2—CH_2O)_4](EtO)_2Si—CH_2—CH(CH_3)—CH_2—SH$,
$[(C_{12}H_{25}O—(CH_2—CH_2O)_5](EtO)_2Si—CH_2—CH(CH_3)—CH_2—SH$,
$[(C_{12}H_{25}O—(CH_2—CH_2O)_6](EtO)_2Si—CH_2—CH(CH_3)—CH_2—SH$,
$[(C_{13}H_{27}O—(CH_2—CH_2O)_2](EtO)_2Si—CH_2—CH(CH_3)—CH_2—SH$,
$[(C_{13}H_{27}O—(CH_2—CH_2O)_3](EtO)_2Si—CH_2—CH(CH_3)—CH_2—SH$,
$[(C_{13}H_{27}O—(CH_2—CH_2O)_4](EtO)_2Si—CH_2—CH(CH_3)—CH_2—SH$,
$[(C_{13}H_{27}O—(CH_2—CH_2O)_5](EtO)_2Si—CH_2—CH(CH_3)—CH_2—SH$,
$[(C_{13}H_{27}O—(CH_2—CH_2O)_6](EtO)_2Si—CH_2—CH(CH_3)—CH_2—SH$,
$[(C_{14}H_{29}O—(CH_2—CH_2O)_2](EtO)_2Si—CH_2—CH(CH_3)—CH_2—SH$,
$[(C_{14}H_{29}O—(CH_2—CH_2O)_3](EtO)_2Si—CH_2—CH(CH_3)—CH_2—SH$,
$[(C_{14}H_{29}O—(CH_2—CH_2O)_4](EtO)_2Si—CH_2—CH(CH_3)—CH_2—SH$,
$[(C_{14}H_{29}O—(CH_2—CH_2O)_5](EtO)_2Si—CH_2—CH(CH_3)—CH_2—SH$,
$[(C_{14}H_{29}O—(CH_2—CH_2O)_6](EtO)_2Si—CH_2—CH(CH_3)—CH_2—SH$,
$[(C_{15}H_{31}O—(CH_2—CH_2O)_2](EtO)_2Si—CH_2—CH(CH_3)—CH_2—SH$,
$[(C_{15}H_{31}O—(CH_2—CH_2O)_3](EtO)_2Si—CH_2—CH(CH_3)—CH_2—SH$,
$[(C_{15}H_{31}O—(CH_2—CH_2O)_4](EtO)_2Si—CH_2—CH(CH_3)—CH_2—SH$,
$[(C_{15}H_{31}O—(CH_2—CH_2O)_5](EtO)_2Si—CH_2—CH(CH_3)—CH_2—SH$,
$[(C_{15}H_{31}O—(CH_2—CH_2O)_6](EtO)_2Si—CH_2—CH(CH_3)—CH_2—SH$,
$[(C_{16}H_{33}O—(CH_2—CH_2O)_2](EtO)_2Si—CH_2—CH(CH_3)—CH_2—SH$,
$[(C_{16}H_{33}O—(CH_2—CH_2O)_3](EtO)_2Si—CH_2—CH(CH_3)—CH_2—SH$,
$[(C_{16}H_{33}O—(CH_2—CH_2O)_4](EtO)_2Si—CH_2—CH(CH_3)—CH_2—SH$,
$[(C_{16}H_{33}O—(CH_2—CH_2O)_5](EtO)_2Si—CH_2—CH(CH_3)—CH_2—SH$,
$[(C_{16}H_{33}O—(CH_2—CH_2O)_6](EtO)_2Si—CH_2—CH(CH_3)—CH_2—SH$,
$[(C_{17}H_{35}O—(CH_2—CH_2O)_2](EtO)_2Si—CH_2—CH(CH_3)—CH_2—SH$,
$[(C_{17}H_{35}O—(CH_2—CH_2O)_3](EtO)_2Si—CH_2—CH(CH_3)—CH_2—SH$,
$[(C_{17}H_{35}O—(CH_2—CH_2O)_4](EtO)_2Si—CH_2—CH(CH_3)—CH_2—SH$,
$[(C_{17}H_{35}O—(CH_2—CH_2O)_5](EtO)_2Si—CH_2—CH(CH_3)—CH_2—SH$,
$[(C_{17}H_{35}O—(CH_2—CH_2O)_6](EtO)_2Si—CH_2—CH(CH_3)—CH_2—SH$,
$[(C_{11}H_{23}O—(CH_2—CH_2O)_2]_2(EtO)Si—CH_2—CH(CH_3)—CH_2—SH$,
$[(C_{11}H_{23}O—(CH_2—CH_2O)_3]_2(EtO)Si—CH_2—CH(CH_3)—CH_2—SH$,
$[(C_{11}H_{23}O—(CH_2—CH_2O)_4]_2(EtO)Si—CH_2—CH(CH_3)—CH_2—SH$,
$[(C_{11}H_{23}O—(CH_2—CH_2O)_5]_2(EtO)Si—CH_2—CH(CH_3)—CH_2—SH$,
$[(C_{11}H_{23}O—(CH_2—CH_2O)_6]_2(EtO)Si—CH_2—CH(CH_3)—CH_2—SH$,
$[(C_{12}H_{25}O—(CH_2—CH_2O)_2]_2(EtO)Si—CH_2—CH(CH_3)—CH_2—SH$,
$[(C_{12}H_{25}O—(CH_2—CH_2O)_3]_2(EtO)Si—CH_2—CH(CH_3)—CH_2—SH$,
$[(C_{12}H_{25}O—(CH_2—CH_2O)_4]_2(EtO)Si—CH_2—CH(CH_3)—CH_2—SH$,
$[(C_{12}H_{25}O—(CH_2—CH_2O)_5]_2(EtO)Si—CH_2—CH(CH_3)—CH_2—SH$,
$[(C_{12}H_{25}O—(CH_2—CH_2O)_6]_2(EtO)Si—CH_2—CH(CH_3)—CH_2—SH$,
$[(C_{13}H_{27}O—(CH_2—CH_2O)_2]_2(EtO)Si—CH_2—CH(CH_3)—CH_2—SH$,
$[(C_{13}H_{27}O—(CH_2—CH_2O)_3]_2(EtO)Si—CH_2—CH(CH_3)—CH_2—SH$,
$[(C_{13}H_{27}O—(CH_2—CH_2O)_4]_2(EtO)Si—CH_2—CH(CH_3)—CH_2—SH$,
$[(C_{13}H_{27}O—(CH_2—CH_2O)_5]_2(EtO)Si—CH_2—CH(CH_3)—CH_2—SH$,
$[(C_{13}H_{27}O—(CH_2—CH_2O)_6]_2(EtO)Si—CH_2—CH(CH_3)—CH_2—SH$,
$[(C_{14}H_{29}O—(CH_2—CH_2O)_2]_2(EtO)Si—CH_2—CH(CH_3)—CH_2—SH$,
$[(C_{14}H_{29}O—(CH_2—CH_2O)_3]_2(EtO)Si—CH_2—CH(CH_3)—CH_2—SH$,
$[(C_{14}H_{29}O—(CH_2—CH_2O)_4]_2(EtO)Si—CH_2—CH(CH_3)—CH_2—SH$,
$[(C_{14}H_{29}O—(CH_2—CH_2O)_5]_2(EtO)Si—CH_2—CH(CH_3)—CH_2—SH$,
$[(C_{14}H_{29}O—(CH_2—CH_2O)_6]_2(EtO)Si—CH_2—CH(CH_3)—CH_2—SH$,
$[(C_{15}H_{31}O—(CH_2—CH_2O)_2]_2(EtO)Si—CH_2—CH(CH_3)—CH_2—SH$,
$[(C_{15}H_{31}O—(CH_2—CH_2O)_3]_2(EtO)Si—CH_2—CH(CH_3)—CH_2—SH$,
$[(C_{15}H_{31}O—(CH_2—CH_2O)_4]_2(EtO)Si—CH_2—CH(CH_3)—CH_2—SH$,
$[(C_{15}H_{31}O—(CH_2—CH_2O)_5]_2(EtO)Si—CH_2—CH(CH_3)—CH_2—SH$,
$[(C_{15}H_{31}O—(CH_2—CH_2O)_6]_2(EtO)Si—CH_2—CH(CH_3)—CH_2—SH$,
$[(C_{16}H_{33}O—(CH_2—CH_2O)_2]_2(EtO)Si—CH_2—CH(CH_3)—CH_2—SH$,
$[(C_{16}H_{33}O—(CH_2—CH_2O)_3]_2(EtO)Si—CH_2—CH(CH_3)—CH_2—SH$,
$[(C_{16}H_{33}O—(CH_2—CH_2O)_4]_2(EtO)Si—CH_2—CH(CH_3)—CH_2—SH$,
$[(C_{16}H_{33}O—(CH_2—CH_2O)_5]_2(EtO)Si—CH_2—CH(CH_3)—CH_2—SH$,
$[(C_{16}H_{33}O—(CH_2—CH_2O)_6]_2(EtO)Si—CH_2—CH(CH_3)—CH_2—SH$,
$[(C_{17}H_{35}O—(CH_2—CH_2O)_2]_2(EtO)Si—CH_2—CH(CH_3)—CH_2—SH$,
$[(C_{17}H_{35}O—(CH_2—CH_2O)_3]_2(EtO)Si—CH_2—CH(CH_3)—CH_2—SH$,
$[(C_{17}H_{35}O—(CH_2—CH_2O)_4]_2(EtO)Si—CH_2—CH(CH_3)—CH_2—SH$,
$[(C_{17}H_{35}O—(CH_2—CH_2O)_5]_2(EtO)Si—CH_2—CH(CH_3)—CH_2—SH$,
$[(C_{17}H_{35}O—(CH_2—CH_2O)_6]_2(EtO)Si—CH_2—CH(CH_3)—CH_2—SH$,
$[(C_{11}H_{23}O—(CH_2—CH_2O)_2]_3Si—CH_2—CH(CH_3)—CH_2—SH$,
$[(C_{11}H_{23}O—(CH_2—CH_2O)_3]_3Si—CH_2—CH(CH_3)—CH_2—SH$,

[(C$_{11}$H$_{23}$O—(CH$_2$—CH$_2$O)$_4$]$_3$Si—CH$_2$—CH(CH$_3$)—CH$_2$—SH,
[(C$_{11}$H$_{23}$O—(CH$_2$—CH$_2$O)$_5$]$_3$Si—CH$_2$—CH(CH$_3$)—CH$_2$—SH,
[(C$_{11}$H$_{23}$O—(CH$_2$—CH$_2$O)$_6$]$_3$Si—CH$_2$—CH(CH$_3$)—CH$_2$—SH,
[(C$_{12}$H$_{25}$O—(CH$_2$—CH$_2$O)$_2$]$_3$Si—CH$_2$—CH(CH$_3$)—CH$_2$—SH,
[(C$_{12}$H$_{25}$O—(CH$_2$—CH$_2$O)$_3$]$_3$Si—CH$_2$—CH(CH$_3$)—CH$_2$—SH,
[(C$_{12}$H$_{25}$O—(CH$_2$—CH$_2$O)$_4$]$_3$Si—CH$_2$—CH(CH$_3$)—CH$_2$—SH,
[(C$_{12}$H$_{25}$O—(CH$_2$—CH$_2$O)$_5$]$_3$Si—CH$_2$—CH(CH$_3$)—CH$_2$—SH,
[(C$_{12}$H$_{25}$O—(CH$_2$—CH$_2$O)$_6$]$_3$Si—CH$_2$—CH(CH$_3$)—CH$_2$—SH,
[(C$_{13}$H$_{27}$O—(CH$_2$—CH$_2$O)$_2$]$_3$Si—CH$_2$—CH(CH$_3$)—CH$_2$—SH,
[(C$_{13}$H$_{27}$O—(CH$_2$—CH$_2$O)$_3$]$_3$Si—CH$_2$—CH(CH$_3$)—CH$_2$—SH,
[(C$_{13}$H$_{27}$O—(CH$_2$—CH$_2$O)$_4$]$_3$Si—CH$_2$—CH(CH$_3$)—CH$_2$—SH,
[(C$_{13}$H$_{27}$O—(CH$_2$—CH$_2$O)$_5$]$_3$Si—CH$_2$—CH(CH$_3$)—CH$_2$—SH,
[(C$_{13}$H$_{27}$O—(CH$_2$—CH$_2$O)$_6$]$_3$Si—CH$_2$—CH(CH$_3$)—CH$_2$—SH,
[(C$_{14}$H$_{29}$O—(CH$_2$—CH$_2$O)$_2$]$_3$Si—CH$_2$—CH(CH$_3$)—CH$_2$—SH,
[(C$_{14}$H$_{29}$O—(CH$_2$—CH$_2$O)$_3$]$_3$Si—CH$_2$—CH(CH$_3$)—CH$_2$—SH,
[(C$_{14}$H$_{29}$O—(CH$_2$—CH$_2$O)$_4$]$_3$Si—CH$_2$—CH(CH$_3$)—CH$_2$—SH,
[(C$_{14}$H$_{29}$O—(CH$_2$—CH$_2$O)$_5$]$_3$Si—CH$_2$—CH(CH$_3$)—CH$_2$—SH,
[(C$_{14}$H$_{29}$O—(CH$_2$—CH$_2$O)$_6$]$_3$Si—CH$_2$—CH(CH$_3$)—CH$_2$—SH,
[(C$_{15}$H$_{31}$O—(CH$_2$—CH$_2$O)$_2$]$_3$Si—CH$_2$—CH(CH$_3$)—CH$_2$—SH,
[(C$_{15}$H$_{31}$O—(CH$_2$—CH$_2$O)$_3$]$_3$Si—CH$_2$—CH(CH$_3$)—CH$_2$—SH,
[(C$_{15}$H$_{31}$O—(CH$_2$—CH$_2$O)$_4$]$_3$Si—CH$_2$—CH(CH$_3$)—CH$_2$—SH,
[(C$_{15}$H$_{31}$O—(CH$_2$—CH$_2$O)$_5$]$_3$Si—CH$_2$—CH(CH$_3$)—CH$_2$—SH,
[(C$_{15}$H$_{31}$O—(CH$_2$—CH$_2$O)$_6$]$_3$Si—CH$_2$—CH(CH$_3$)—CH$_2$—SH,
[(C$_{16}$H$_{33}$O—(CH$_2$—CH$_2$O)$_2$]$_3$Si—CH$_2$—CH(CH$_3$)—CH$_2$—SH,
[(C$_{16}$H$_{33}$O—(CH$_2$—CH$_2$O)$_3$]$_3$Si—CH$_2$—CH(CH$_3$)—CH$_2$—SH,
[(C$_{16}$H$_{33}$O—(CH$_2$—CH$_2$O)$_4$]$_3$Si—CH$_2$—CH(CH$_3$)—CH$_2$—SH,
[(C$_{16}$H$_{33}$O—(CH$_2$—CH$_2$O)$_5$]$_3$Si—CH$_2$—CH(CH$_3$)—CH$_2$—SH,
[(C$_{16}$H$_{33}$O—(CH$_2$—CH$_2$O)$_6$]$_3$Si—CH$_2$—CH(CH$_3$)—CH$_2$—SH,
[(C$_{17}$H$_{35}$O—(CH$_2$—CH$_2$O)$_2$]$_3$Si—CH$_2$—CH(CH$_3$)—CH$_2$—SH,
[(C$_{17}$H$_{35}$O—(CH$_2$—CH$_2$O)$_3$]$_3$Si—CH$_2$—CH(CH$_3$)—CH$_2$—SH,
[(C$_{17}$H$_{35}$O—(CH$_2$—CH$_2$O)$_4$]$_3$Si—CH$_2$—CH(CH$_3$)—CH$_2$—SH,
[(C$_{17}$H$_{35}$O—(CH$_2$—CH$_2$O)$_5$]$_3$Si—CH$_2$—CH(CH$_3$)—CH$_2$—SH,
[(C$_{17}$H$_{35}$O—(CH$_2$—CH$_2$O)$_6$]$_3$Si—CH$_2$—CH(CH$_3$)—CH$_2$—SH, where R$^6$ can be branched or unbranched.

Preferred compounds of the formula I where R$^4$=CN can be:
[(C$_{11}$H$_{23}$O—(CH$_2$—CH$_2$O)$_2$](EtO)$_2$Si(CH$_2$)$_3$SCN,
[(C$_{11}$H$_{23}$O—(CH$_2$—CH$_2$O)$_3$](EtO)$_2$Si(CH$_2$)$_3$SCN,
[(C$_{11}$H$_{23}$O—(CH$_2$—CH$_2$O)$_4$](EtO)$_2$Si(CH$_2$)$_3$SCN,
[(C$_{11}$H$_{23}$O—(CH$_2$—CH$_2$O)$_5$](EtO)$_2$Si(CH$_2$)$_3$SCN,
[(C$_{11}$H$_{23}$O—(CH$_2$—CH$_2$O)$_6$](EtO)$_2$Si(CH$_2$)$_3$SCN,
[(C$_{12}$H$_{25}$O—(CH$_2$—CH$_2$O)$_2$](EtO)$_2$Si(CH$_2$)$_3$SCN,
[(C$_{12}$H$_{25}$O—(CH$_2$—CH$_2$O)$_3$](EtO)$_2$Si(CH$_2$)$_3$SCN,
[(C$_{12}$H$_{25}$O—(CH$_2$—CH$_2$O)$_4$](EtO)$_2$Si(CH$_2$)$_3$SCN,
[(C$_{12}$H$_{25}$O—(CH$_2$—CH$_2$O)$_5$](EtO)$_2$Si(CH$_2$)$_3$SCN,
[(C$_{12}$H$_{25}$O—(CH$_2$—CH$_2$O)$_6$](EtO)$_2$Si(CH$_2$)$_3$SCN,
[(C$_{13}$H$_{27}$O—(CH$_2$—CH$_2$O)$_2$](EtO)$_2$Si(CH$_2$)$_3$SCN,
[(C$_{13}$H$_{27}$O—(CH$_2$—CH$_2$O)$_3$](EtO)$_2$Si(CH$_2$)$_3$SCN,
[(C$_{13}$H$_{27}$O—(CH$_2$—CH$_2$O)$_4$](EtO)$_2$Si(CH$_2$)$_3$SCN,
[(C$_{13}$H$_{27}$O—(CH$_2$—CH$_2$O)$_5$](EtO)$_2$Si(CH$_2$)$_3$SCN,
[(C$_{13}$H$_{27}$O—(CH$_2$—CH$_2$O)$_6$](EtO)$_2$Si(CH$_2$)$_3$SCN,
[(C$_{14}$H$_{29}$O—(CH$_2$—CH$_2$O)$_2$](EtO)$_2$Si(CH$_2$)$_3$SCN,
[(C$_{14}$H$_{29}$O—(CH$_2$—CH$_2$O)$_3$](EtO)$_2$Si(CH$_2$)$_3$SCN,
[(C$_{14}$H$_{29}$O—(CH$_2$—CH$_2$O)$_4$](EtO)$_2$Si(CH$_2$)$_3$SCN,
[(C$_{14}$H$_{29}$O—(CH$_2$—CH$_2$O)$_5$](EtO)$_2$Si(CH$_2$)$_3$SCN,
[(C$_{14}$H$_{29}$O—(CH$_2$—CH$_2$O)$_6$](EtO)$_2$Si(CH$_2$)$_3$SCN,
[(C$_{11}$H$_{23}$O—(CH$_2$—CH$_2$O)$_2$]$_2$(EtO)Si(CH$_2$)$_3$SCN,
[(C$_{11}$H$_{23}$O—(CH$_2$—CH$_2$O)$_3$]$_2$(EtO)Si(CH$_2$)$_3$SCN,
[(C$_{11}$H$_{23}$O—(CH$_2$—CH$_2$O)$_4$]$_2$(EtO)Si(CH$_2$)$_3$SCN,
[(C$_{11}$H$_{23}$O—(CH$_2$—CH$_2$O)$_5$]$_2$(EtO)Si(CH$_2$)$_3$SCN,
[(C$_{11}$H$_{23}$O—(CH$_2$—CH$_2$O)$_6$]$_2$(EtO)Si(CH$_2$)$_3$SCN,
[(C$_{12}$H$_{25}$O—(CH$_2$—CH$_2$O)$_2$]$_2$(EtO)Si(CH$_2$)$_3$SCN,
[(C$_{12}$H$_{25}$O—(CH$_2$—CH$_2$O)$_3$]$_2$(EtO)Si(CH$_2$)$_3$SCN,
[(C$_{12}$H$_{25}$O—(CH$_2$—CH$_2$O)$_4$]$_2$ (EtO)Si(CH$_2$)$_3$SCN,
[(C$_{12}$H$_{25}$O—(CH$_2$—CH$_2$O)$_5$]$_2$(EtO)Si(CH$_2$)$_3$SCN,
[(C$_{12}$H$_{25}$O—(CH$_2$—CH$_2$O)$_6$]$_2$(EtO)Si(CH$_2$)$_3$SCN,
[(C$_{13}$H$_{27}$O—(CH$_2$—CH$_2$O)$_2$]$_2$(EtO)Si(CH$_2$)$_3$SCN,
[(C$_{13}$H$_{27}$O—(CH$_2$—CH$_2$O)$_3$]$_2$(EtO)Si(CH$_2$)$_3$SCN,
[(C$_{13}$H$_{27}$O—(CH$_2$—CH$_2$O)$_4$]$_2$ (EtO)Si(CH$_2$)$_3$SCN,
[(C$_{13}$H$_{27}$O—(CH$_2$—CH$_2$O)$_5$]$_2$(EtO)Si(CH$_2$)$_3$SCN,
[(C$_{13}$H$_{27}$O—(CH$_2$—CH$_2$O)$_6$]$_2$(EtO)Si(CH$_2$)$_3$SCN,
[(C$_{14}$H$_{29}$O—(CH$_2$—CH$_2$O)$_2$]$_2$(EtO)Si(CH$_2$)$_3$SCN,
[(C$_{14}$H$_{29}$O—(CH$_2$—CH$_2$O)$_3$]$_2$(EtO)Si(CH$_2$)$_3$SCN,
[(C$_{14}$H$_{29}$O—(CH$_2$—CH$_2$O)$_4$]$_2$ (EtO)Si(CH$_2$)$_3$SCN,
[(C$_{14}$H$_{29}$O—(CH$_2$—CH$_2$O)$_5$]$_2$(EtO)Si(CH$_2$)$_3$SCN,
[(C$_{14}$H$_{29}$O—(CH$_2$—CH$_2$O)$_6$]$_2$(EtO)Si(CH$_2$)$_3$SCN,
[(C$_{11}$H$_{23}$O—(CH$_2$—CH$_2$O)$_2$]$_3$(EtO)Si(CH$_2$)$_3$SCN,
[(C$_{11}$H$_{23}$O—(CH$_2$—CH$_2$O)$_3$]$_3$(EtO)Si(CH$_2$)$_3$SCN,
[(C$_{11}$H$_{23}$O—(CH$_2$—CH$_2$O)$_4$]$_3$ (EtO)Si(CH$_2$)$_3$SCN,
[(C$_{11}$H$_{23}$O—(CH$_2$—CH$_2$O)$_5$]$_3$(EtO)Si(CH$_2$)$_3$SCN,
[(C$_{11}$H$_{23}$O—(CH$_2$—CH$_2$O)$_6$]$_3$(EtO)Si(CH$_2$)$_3$SCN,
[(C$_{12}$H$_{25}$O—(CH$_2$—CH$_2$O)$_2$]$_3$(EtO)Si(CH$_2$)$_3$SCN,
[(C$_{12}$H$_{25}$O—(CH$_2$—CH$_2$O)$_3$]$_3$(EtO)Si(CH$_2$)$_3$SCN,
[(C$_{12}$H$_{25}$O—(CH$_2$—CH$_2$O)$_4$]$_3$ (EtO)Si(CH$_2$)$_3$SCN,
[(C$_{12}$H$_{25}$O—(CH$_2$—CH$_2$O)$_5$]$_3$(EtO)Si(CH$_2$)$_3$SCN,
[(C$_{12}$H$_{25}$O—(CH$_2$—CH$_2$O)$_6$]$_3$(EtO)Si(CH$_2$)$_3$SCN,
[(C$_{13}$H$_{27}$O—(CH$_2$—CH$_2$O)$_2$]$_3$(EtO)Si(CH$_2$)$_3$SCN,
[(C$_{13}$H$_{27}$O—(CH$_2$—CH$_2$O)$_3$]$_3$(EtO)Si(CH$_2$)$_3$SCN,
[(C$_{13}$H$_{27}$O—(CH$_2$—CH$_2$O)$_4$]$_3$ (EtO)Si(CH$_2$)$_3$SCN,
[(C$_{13}$H$_{27}$O—(CH$_2$—CH$_2$O)$_5$]$_3$(EtO)Si(CH$_2$)$_3$SCN,
[(C$_{13}$H$_{27}$O—(CH$_2$—CH$_2$O)$_6$]$_3$(EtO)Si(CH$_2$)$_3$SCN,
[(C$_{14}$H$_{29}$O—(CH$_2$—CH$_2$O)$_2$]$_3$(EtO)Si(CH$_2$)$_3$SCN,
[(C$_{14}$H$_{29}$O—(CH$_2$—CH$_2$O)$_3$]$_3$(EtO)Si(CH$_2$)$_3$SCN,
[(C$_{14}$H$_{29}$O—(CH$_2$—CH$_2$O)$_4$]$_3$ (EtO)Si(CH$_2$)$_3$SCN,
[(C$_{14}$H$_{29}$O—(CH$_2$—CH$_2$O)$_5$]$_3$(EtO)Si(CH$_2$)$_3$SCN,
[(C$_{14}$H$_{29}$O—(CH$_2$—CH$_2$O)$_6$]$_3$(EtO)Si(CH$_2$)$_3$SCN, where R$^6$ can be branched or unbranched.

Preferred compounds of the formula I where R$^4$=—C(=O)—R$^9$ and R$^9$=branched or unbranched —C$_5$H$_{11}$, —C$_6$H$_{33}$, —C$_7$H$_{15}$, —C$_8$H$_{17}$, C$_9$H$_{19}$, —C$_{10}$H$_{21}$, —C$_{11}$H$_{23}$, —$C_{12}H_{25}$, —$C_{13}H_{27}$, —$C_{14}H_{29}$, —$C_{15}H_{31}$, —$C_{16}H_{33}$, —$C_{17}H_{35}$ and —$C_6H_5$(phenyl) can be:

[($C_{11}H_{23}$O—($CH_2$—$CH_2$O)$_2$](EtO)$_2$Si($CH_2$)$_3$—C(=O)—$R^9$,
[($C_{11}H_{23}$O—($CH_2$—$CH_2$O)$_3$](EtO)$_2$Si($CH_2$)$_3$—C(=O)—$R^9$,
[($C_{11}H_{23}$O—($CH_2$—$CH_2$O)$_4$](EtO)$_2$Si($CH_2$)$_3$—C(=O)—$R^9$,
[($C_{11}H_{23}$O—($CH_2$—$CH_2$O)$_5$](EtO)$_2$Si($CH_2$)$_3$—C(=O)—$R^9$,
[($C_{11}H_{23}$O—($CH_2$—$CH_2$O)$_6$](EtO)$_2$Si($CH_2$)$_3$—C(=O)—$R^9$,
[($C_{12}H_{25}$O—($CH_2$—$CH_2$O)$_2$](EtO)$_2$Si($CH_2$)$_3$—C(=O)—$R^9$,
[($C_{12}H_{25}$O—($CH_2$—$CH_2$O)$_3$](EtO)$_2$Si($CH_2$)$_3$—C(=O)—$R^9$,
[($C_{12}H_{25}$O—($CH_2$—$CH_2$O)$_4$](EtO)$_2$Si($CH_2$)$_3$—C(=O)—$R^9$,
[($C_{12}H_{25}$O—($CH_2$—$CH_2$O)$_5$](EtO)$_2$Si($CH_2$)$_3$—C(=O)—$R^9$,
[($C_{12}H_{25}$O—($CH_2$—$CH_2$O)$_6$](EtO)$_2$Si($CH_2$)$_3$—C(=O)—$R^9$,
[($C_{13}H_{27}$O—($CH_2$—$CH_2$O)$_2$](EtO)$_2$Si($CH_2$)$_3$—C(=O)—$R^9$,
[($C_{13}H_{27}$O—($CH_2$—$CH_2$O)$_3$](EtO)$_2$Si($CH_2$)$_3$—C(=O)—$R^9$,
[($C_{13}H_{27}$O—($CH_2$—$CH_2$O)$_4$](EtO)$_2$Si($CH_2$)$_3$—C(=O)—$R^9$,
[($C_{13}H_{27}$O—($CH_2$—$CH_2$O)$_5$](EtO)$_2$Si($CH_2$)$_3$—C(=O)—$R^9$,
[($C_{13}H_{27}$O—($CH_2$—$CH_2$O)$_6$](EtO)$_2$Si($CH_2$)$_3$—C(=O)—$R^9$,
[($C_{14}H_{29}$O—($CH_2$—$CH_2$O)$_2$](EtO)$_2$Si($CH_2$)$_3$—C(=O)—$R^9$,
[($C_{14}H_{29}$O—($CH_2$—$CH_2$O)$_3$](EtO)$_2$Si($CH_2$)$_3$—C(=O)—$R^9$,
[($C_{14}H_{29}$O—($CH_2$—$CH_2$O)$_4$](EtO)$_2$Si($CH_2$)$_3$—C(=O)—$R^9$,
[($C_{14}H_{29}$O—($CH_2$—$CH_2$O)$_5$](EtO)$_2$Si($CH_2$)$_3$—C(=O)—$R^9$,
[($C_{14}H_{29}$O—($CH_2$—$CH_2$O)$_6$](EtO)$_2$Si($CH_2$)$_3$—C(=O)—$R^9$,
[($C_{11}H_{23}$O—($CH_2$—$CH_2$O)$_2$]$_2$(EtO)Si($CH_2$)$_3$—C(=O)—$R^9$,
[($C_{11}H_{23}$O—($CH_2$—$CH_2$O)$_3$]$_2$(EtO)Si($CH_2$)$_3$—C(=O)—$R^9$,
[($C_{11}H_{23}$O—($CH_2$—$CH_2$O)$_4$]$_2$(EtO)Si($CH_2$)$_3$—C(=O)—$R^9$,
[($C_{11}H_{23}$O—($CH_2$—$CH_2$O)$_5$]$_2$(EtO)Si($CH_2$)$_3$—C(=O)—$R^9$,
[($C_{11}H_{23}$O—($CH_2$—$CH_2$O)$_6$]$_2$(EtO)Si($CH_2$)$_3$—C(=O)—$R^9$,
[($C_{12}H_{25}$O—($CH_2$—$CH_2$O)$_2$]$_2$(EtO)Si($CH_2$)$_3$—C(=O)—$R^9$,
[($C_{12}H_{25}$O—($CH_2$—$CH_2$O)$_3$]$_2$(EtO)Si($CH_2$)$_3$—C(=O)—$R^9$,
[($C_{12}H_{25}$O—($CH_2$—$CH_2$O)$_4$]$_2$(EtO)Si($CH_2$)$_3$—C(=O)—$R^9$,
[($C_{12}H_{25}$O—($CH_2$—$CH_2$O)$_5$]$_2$(EtO)Si($CH_2$)$_3$—C(=O)—$R^9$,
[($C_{12}H_{25}$O—($CH_2$—$CH_2$O)$_6$]$_2$(EtO)Si($CH_2$)$_3$—C(=O)—$R^9$,
[($C_{13}H_{27}$O—($CH_2$—$CH_2$O)$_2$]$_2$(EtO)Si($CH_2$)$_3$—C(=O)—$R^9$,
[($C_{13}H_{27}$O—($CH_2$—$CH_2$O)$_3$]$_2$(EtO)Si($CH_2$)$_3$—C(=O)—$R^9$,
[($C_{13}H_{27}$O—($CH_2$—$CH_2$O)$_4$]$_2$(EtO)Si($CH_2$)$_3$—C(=O)—$R^9$,
[($C_{13}H_{27}$O—($CH_2$—$CH_2$O)$_5$]$_2$(EtO)Si($CH_2$)$_3$—C(=O)—$R^9$,
[($C_{13}H_{27}$O—($CH_2$—$CH_2$O)$_6$]$_2$(EtO)Si($CH_2$)$_3$—C(=O)—$R^9$,
[($C_{14}H_{29}$O—($CH_2$—$CH_2$O)$_2$]$_2$(EtO)Si($CH_2$)$_3$—C(=O)—$R^9$,
[($C_{14}H_{29}$O—($CH_2$—$CH_2$O)$_3$]$_2$(EtO)Si($CH_2$)$_3$—C(=O)—$R^9$,
[($C_{14}H_{29}$O—($CH_2$—$CH_2$O)$_4$]$_2$(EtO)Si($CH_2$)$_3$—C(=O)—$R^9$,
[($C_{14}H_{29}$O—($CH_2$—$CH_2$O)$_5$]$_2$(EtO)Si($CH_2$)$_3$—C(=O)—$R^9$,
[($C_{14}H_{29}$O—($CH_2$—$CH_2$O)$_6$]$_2$(EtO)Si($CH_2$)$_3$—C(=O)—$R^9$,
[($C_{11}H_{23}$O—($CH_2$—$CH_2$O)$_2$]$_3$Si($CH_2$)$_3$—C(=O)—$R^9$,
[($C_{11}H_{23}$O—($CH_2$—$CH_2$O)$_3$]$_3$Si($CH_2$)$_3$—C(=O)—$R^9$,
[($C_{11}H_{23}$O—($CH_2$—$CH_2$O)$_4$]$_3$Si($CH_2$)$_3$—C(=O)—$R^9$,
[($C_{11}H_{23}$O—($CH_2$—$CH_2$O)$_5$]$_3$Si($CH_2$)$_3$—C(=O)—$R^9$,
[($C_{11}H_{23}$O—($CH_2$—$CH_2$O)$_6$]$_3$Si($CH_2$)$_3$—C(=O)—$R^9$,
[($C_{12}H_{25}$O—($CH_2$—$CH_2$O)$_2$]$_3$Si($CH_2$)$_3$—C(=O)—$R^9$,
[($C_{12}H_{25}$O—($CH_2$—$CH_2$O)$_3$]$_3$Si($CH_2$)$_3$—C(=O)—$R^9$,
[($C_{12}H_{25}$O—($CH_2$—$CH_2$O)$_4$]$_3$Si($CH_2$)$_3$—C(=O)—$R^9$,
[($C_{12}H_{25}$O—($CH_2$—$CH_2$O)$_5$]$_3$Si($CH_2$)$_3$—C(=O)—$R^9$,
[($C_{12}H_{25}$O—($CH_2$—$CH_2$O)$_6$]$_3$Si($CH_2$)$_3$—C(=O)—$R^9$,
[($C_{13}H_{27}$O—($CH_2$—$CH_2$O)$_2$]$_3$Si($CH_2$)$_3$—C(=O)—$R^9$,
[($C_{13}H_{27}$O—($CH_2$—$CH_2$O)$_3$]$_3$Si($CH_2$)$_3$—C(=O)—$R^9$,
[($C_{13}H_{27}$O—($CH_2$—$CH_2$O)$_4$]$_3$Si($CH_2$)$_3$—C(=O)—$R^9$,
[($C_{13}H_{27}$O—($CH_2$—$CH_2$O)$_5$]$_3$Si($CH_2$)$_3$—C(=O)—$R^9$,
[($C_{13}H_{27}$O—($CH_2$—$CH_2$O)$_6$]$_3$Si($CH_2$)$_3$—C(=O)—$R^9$,
[($C_{14}H_{29}$O—($CH_2$—$CH_2$O)$_2$]$_3$Si($CH_2$)$_3$—C(=O)—$R^9$,
[($C_{14}H_{29}$O—($CH_2$—$CH_2$O)$_3$]$_3$Si($CH_2$)$_3$—C(=O)—$R^9$,
[($C_{14}H_{29}$O—($CH_2$—$CH_2$O)$_4$]$_3$Si($CH_2$)$_3$—C(=O)—$R^9$,
[($C_{14}H_{29}$O—($CH_2$—$CH_2$O)$_5$]$_3$Si($CH_2$)$_3$—C(=O)—$R^9$,
[($C_{14}H_{29}$O—($CH_2$—$CH_2$O)$_6$]$_3$Si($CH_2$)$_3$—C(=O)—$R^9$, $R^6$ can preferably be $C_{12}$ to $C_{17}$, very particularly preferably $C_{12}$ to $C_{16}$, extremely preferably $C_{12}$ to $C_{14}$, unsubstituted or substituted, branched or unbranched monovalent alkyl.

$R^6$ can be a —$C_{11}H_{23}$, —$C_{12}H_{25}$, —$C_{13}H_{27}$, —$C_{14}H_{29}$, —$C_{15}H_{31}$, —$C_{16}H_{33}$ or —$C_{17}H_{35}$ alkyl group.

$R^6$ can preferably be $C_{11}$ to $C_{35}$, particularly preferably $C_{11}$ to $C_{30}$, very particularly preferably $C_{12}$ to $C_{30}$, extremely preferably $C_{13}$ to $C_{20}$, unsubstituted or substituted, branched or unbranched monovalent alkenyl.

$R^6$ can preferably be $C_{11}$ to $C_{14}$ and/or $C_{16}$ to $C_{30}$, very particularly preferably $C_{11}$ to $C_{14}$ and/or $C_{16}$ to $C_{25}$, extremely preferably $C_{12}$ to $C_{14}$ and/or $C_{16}$ to $C_{20}$, unsubstituted or substituted, branched or unbranched monovalent aralkyl.

$R^6$ as alkenyl can be $C_{11}H_{21}$, —$C_{12}H_{23}$, —$C_{13}H_{25}$, —$C_{14}H_{27}$, —$C_{15}H_{29}$, —$C_{16}H_{31}$ or —$C_{17}H_{33}$.

$R^1$ can be an alkoxylated castor oil (e.g. CAS 61791-12-6).

$R^1$ can be an alkoxylated oleylamine (e.g. CAS 26635-93-8).

The polyether group ($R^5$O)$_m$ can comprise random units of ethylene and propylene oxide or polyether blocks made of polyethylene oxide and polypropylene oxide.

The polyether group ($R^5$—O)$_m$ can preferably be:
(—O—$CH_2$—$CH_2$—)$_a$,
(—O—CH($CH_3$)—$CH_2$—)$_a$,
(—O—$CH_2$—CH($CH_3$)—)$_a$,
(—O—$CH_2$—$CH_2$—)$_a$(—O—CH($CH_3$)—$CH_2$—)$_a$,
(—O—$CH_2$—$CH_2$—)(—O—CH($CH_3$)—$CH_2$—)$_a$,
(—O—$CH_2$—$CH_2$—)$_a$(—O—$CH_2$—CH($CH_3$)—)$_a$, (—O—CH$_2$—CH$_2$—)(—O—CH$_2$—CH(CH$_3$)—)$_a$,
(—O—CH(CH$_3$)—CH$_2$—)$_a$(—O—CH$_2$—CH(CH$_3$)—),
(—O—CH(CH$_3$)—CH$_2$—)(—O—CH$_2$—CH(CH$_3$)—)$_a$,
(—O—CH$_2$—CH$_2$—)$_a$(—O—CH(CH$_3$)—CH$_2$—)$_b$(—O—CH$_2$—CH(CH$_3$)—)$_a$ or a combination of these,
where a, b and c are mutually independent and
a is from 1 to 50, preferably from 2 to 30, particularly preferably from 3 to 20, very particularly preferably from 4 to 15, extremely preferably from 5 to 12,
b is from 1 to 50, preferably from 2 to 30, particularly preferably from 3 to 20, very particularly preferably from 4 to 15, extremely preferably from 5 to 12 and
c is from 1 to 50, preferably from 2 to 30, particularly preferably from 3 to 20, very particularly preferably from 4 to 15, extremely preferably from 5 to 12.

The indices a, b and c are integers and denote the number of repeating units.

When $R^4$ is —H, —CN or —C(=O)—$R^9$, the group $(R^5$—O)$_m$ can preferably comprise ethylene oxide units (CH$_2$—CH$_2$—O)$_a$ or propylene oxide units (CH(CH$_3$)—CH$_2$—O)$_a$ or (CH$_2$—CH(CH$_3$)—O)$_a$.

When $R^4$ is —H, —CN or —C(=O)—$R^9$, the group $(R^5$—O)$_m$ can preferably comprise the following randomly distributed or in blocks: ethylene oxide units (CH$_2$—CH$_2$—O), or propylene oxide units (CH(CH$_3$)—CH$_2$—O) or (CH$_2$—CH(CH$_3$)—O)$_a$.

When $R^4$ is —H, the alkyl polyether group $(R^5$—O)$_m$ can preferably comprise the following randomly distributed or in blocks: ethylene oxide units (CH$_2$—CH$_2$—O)$_a$ or propylene oxide units (CH(CH$_3$)—CH$_2$—O)$_a$ or (CH$_2$—CH(CH$_3$)—O)$_a$.

When $R^4$ is —H, the group $(R^5$—O)$_m$ can preferably comprise propylene oxide units (CH(CH$_3$)—CH$_2$—O), or (CH$_2$—CH(CH$_3$)—O)$_a$.

When $R^4$ is —H, —CN or —C(C=O)—$R^9$, the alkyl polyether group O—$(R^5$—O)$_m$—$R^6$ can be:
O—(CH$_2$—CH$_2$O)$_2$—C$_{11}$H$_{23}$, O—(CH$_2$—CH$_2$O)$_3$—C$_{11}$H$_{23}$, O—(CH$_2$—CH$_2$O)$_4$—C$_{11}$H$_{23}$, O—(CH$_2$—CH$_2$O)$_5$—C$_{11}$H$_{23}$, O—(CH$_2$—CH$_2$O)$_6$—C$_{11}$H$_{23}$, O—(CH$_2$—CH$_2$O)$_7$—C$_{11}$H$_{23}$,
O—(CH(CH$_3$)—CH$_2$O)$_2$—C$_{11}$H$_{23}$, O—(CH(CH$_3$)—CH$_2$O)$_3$—C$_{11}$H$_{23}$, O—(CH(CH$_3$)—CH$_2$O)$_4$—C$_{11}$H$_{23}$, O—(CH(CH$_3$)—CH$_2$O)$_5$—C$_{11}$H$_{23}$, O—(CH(CH$_3$)—CH$_2$O)$_6$—C$_{11}$H$_{23}$, O—(CH(CH$_3$)—CH$_2$O)$_7$C$_{11}$H$_{23}$,
O—(CH$_2$—CH$_2$O)$_2$—C$_{12}$H$_{25}$, O—(CH$_2$—CH$_2$O)$_3$—C$_{12}$H$_{25}$, O—(CH$_2$—CH$_2$O)$_4$—C$_{12}$H$_{25}$, O—(CH$_2$—CH$_2$O)$_5$—C$_{12}$H$_{25}$, O—(CH$_2$—CH$_2$O)$_6$—C$_{12}$H$_{25}$, O—(CH$_2$—CH$_2$O)—C$_{12}$H$_{25}$,
O—(CH(CH$_3$)—CH$_2$O)$_2$—C$_{12}$H$_{25}$, O—(CH(CH$_3$)—CH$_2$O)$_3$—C$_{12}$H$_{25}$, O—(CH(CH$_3$)—CH$_2$O)$_4$—C$_{12}$H$_{25}$, O—(CH(CH$_3$)—CH$_2$O)$_5$—C$_{12}$H$_{25}$, O—(CH(CH$_3$)—CH$_2$O)$_6$—C$_{12}$H$_{25}$, O—(CH(CH$_3$)—CH$_3$O)$_7$—C$_{12}$H$_{25}$,
O—(CH$_2$—CH$_2$O)$_2$—C$_{13}$H$_{27}$, O—(CH$_2$—CH$_2$O)$_3$—C$_{13}$H$_{27}$, O—(CH$_2$—CH$_2$O)$_4$—C$_{13}$H$_{27}$, O—(CH$_2$—CH$_2$O)$_5$—C$_{13}$H$_{27}$, O—(CH$_2$—CH$_2$O)$_6$—C$_{13}$H$_{27}$, O—(CH$_2$—CH$_2$O)$_7$—C$_{13}$H$_{27}$,
O—(CH(CH$_3$)—CH$_2$O)$_2$—C$_{13}$H$_{27}$, O—(CH(CH$_3$)—CH$_2$O)$_3$—C$_{13}$H$_{27}$, O—(CH(CH$_3$)—CH$_2$O)$_4$—C$_{13}$H$_{27}$—, O—(CH(CH$_3$)—CH$_2$O)$_5$—C$_{13}$H$_{27}$, O—(CH(CH$_3$)—CH$_2$O)$_6$—C$_{13}$H$_{27}$, O—(CH(CH$_3$)—CH$_2$O)$_7$—C$_{13}$H$_{27}$,
O—(CH$_2$—CH$_2$O)$_2$—C$_{14}$H$_{29}$, O—(CH$_2$—CH$_2$O)$_3$—C$_{14}$H$_{29}$), O—(CH$_2$—CH$_2$O)$_4$—C$_{14}$H$_{29}$, O—(CH$_2$—CH$_2$O)$_5$—C$_{14}$H$_{29}$, O—(CH$_2$—CH$_2$O)$_3$—C$_{14}$H$_{29}$, O—(CH$_2$—CH$_2$O)$_7$—C$_{14}$H$_{29}$,
O—(CH(CH$_3$)—CH$_2$O)$_2$—C$_{14}$H$_{29}$, O—(CH(CH$_3$)—CH$_2$O)$_3$—C$_{14}$H$_{29}$, O—(CH(CH$_3$)—CH$_2$O)$_4$—C$_{14}$H$_{29}$, O—(CH(CH$_3$)—CH$_2$O)$_5$—C$_{14}$H$_{29}$, O—(CH(CH$_3$)—CH$_2$O)$_6$—C$_{14}$H$_{29}$, O—(CH(CH$_3$)—CH$_2$O)$_7$—C$_{14}$H$_{29}$,
O—(CH$_2$—CH$_2$O)$_2$—C$_{15}$H$_{31}$, O—(CH$_2$—CH$_2$O)$_3$—C$_{15}$H$_{31}$, O—(CH$_2$—CH$_2$O)$_4$—C$_{15}$H$_{31}$, O—(CH$_2$—CH$_2$O)$_5$—C$_{15}$H$_{31}$, O—(CH$_2$—CH$_2$O)$_6$—C$_{15}$H$_{31}$, O—(CH$_2$—CH$_2$O)$_7$—C$_{15}$H$_{31}$,
O—(CH(CH$_3$)—CH$_2$O)$_2$—C$_{15}$H$_{31}$, O—(CH(CH$_3$)—CH$_2$O)$_3$—C$_{15}$H$_{31}$, O—(CH(CH$_3$)—CH$_2$O)$_4$—C$_{15}$H$_{31}$, O—(CH(CH$_3$)—CH$_2$O)$_5$—C$_{15}$H$_{31}$, O—(CH(CH$_3$)—CH$_2$O)$_6$—C$_{15}$H$_{31}$, O—(CH(CH$_3$)—CH$_2$O)$_7$—C$_{15}$H$_{31}$,
O—(CH$_2$—CH$_2$O)$_2$—C$_{16}$H$_{33}$, O—(CH$_2$—CH$_2$O)$_3$—C$_{16}$H$_{33}$, O—(CH$_2$—CH$_2$O)$_4$—C$_{16}$H$_{33}$, O—(CH$_2$—CH$_2$O)$_5$—C$_{16}$H$_{33}$, O—(CH$_2$—CH$_2$O)$_6$—C$_{16}$H$_{33}$, O—(CH$_2$—CH$_2$O)$_7$—C$_{16}$H$_{33}$,
O—(CH(CH$_3$)—CH$_2$O)$_2$—C$_{16}$H$_{33}$, O—(CH(CH$_3$)—CH$_2$O)$_3$—C$_{16}$H$_{33}$, O—(CH(CH$_3$)—CH$_2$O)$_4$—C$_{16}$H$_{33}$, O—(CH(CH$_3$)—CH$_2$O)$_5$—C$_{16}$H$_{33}$, O—(CH(CH$_3$)—CH$_2$O)$_6$—C$_{16}$H$_{33}$, O—(CH(CH$_3$)—CH$_2$O)$_7$—C$_{16}$H$_{33}$,
O—(CH$_2$—CH$_2$O)$_2$—C$_{17}$H$_{35}$, O—(CH$_2$—CH$_2$O)$_3$—C$_{17}$H$_{35}$, O—(CH$_2$—CH$_2$O)$_4$C$_{17}$H$_{35}$, O—(CH$_2$—CH$_2$O)$_5$—C$_{17}$H$_{35}$, O—(CH$_2$—CH$_2$O)$_6$—C$_{17}$H$_{35}$, O—(CH$_2$—CH$_2$O)$_7$—C$_{17}$H$_{35}$,
O—(CH(CH$_3$)—CH$_2$O)$_2$—C$_{17}$H$_{35}$, O—(CH(CH$_3$)—CH$_2$O)$_3$—C$_{17}$H$_{35}$, O—(CH(CH$_3$)—CH$_2$O)$_4$—C$_{17}$H$_{35}$, O—(CH(CH$_3$)—CH$_2$O)$_5$—C$_{17}$H$_{35}$, O—(CH(CH$_3$)—CH$_2$O)$_6$—C$_{17}$H$_{35}$ or O—(CH(CH$_3$)—CH$_2$O)$_7$—C$_{17}$H$_{35}$.

The group $R^5$ can have substitution. The group $R^6$ can be $R^1$ can be —O—(C$_2$H$_4$—O)$_5$—C$_{11}$H$_{23}$, —O—(C$_2$H$_4$—O)$_5$—C$_{12}$H$_{25}$, —O—(C$_2$H$_4$—O)$_5$—C$_{13}$H$_{27}$, —O—(C$_2$H$_4$—O)$_5$—C$_{14}$H$_{29}$, —O—(C$_2$H$_4$—O)$_5$—C$_{15}$H$_{31}$, —O—(C$_2$H$_4$—O)$_3$—C$_{13}$H$_{27}$, —O—(C$_2$H$_4$—O)$_4$—C$_{13}$H$_{27}$, —O—(C$_2$H$_4$—O)$_6$—C$_{13}$H$_{27}$, —O—(C$_2$H$_4$—O)$_7$—C$_{13}$H$_{27}$, —O—(CH$_2$CH$_2$—O)$_5$—(CH$_2$)$_{10}$CH$_3$, —O—(CH$_2$CH$_2$—O)$_5$—(CH$_2$)$_{11}$CH$_3$, —O—(CH$_2$CH$_2$O)$_5$—(CH$_2$)$_{12}$CH$_3$, —O—(CH$_2$CH$_2$—O)$_5$—(CH$_2$)$_{13}$CH$_3$, —O—(CH$_2$CH$_2$—O)$_5$—(CH$_2$)$_{14}$CH$_3$, —O—(CH$_2$CH$_2$—O)$_3$—(CH$_2$)$_{12}$CH$_3$, —O—(CH$_2$CH$_2$—O)$_4$—(CH$_2$)$_{12}$CH$_3$, —O—(CH$_2$CH$_2$—O)$_6$—(CH$_2$)$_{12}$CH$_3$, —O—(CH$_2$CH$_2$—O)$_7$—(CH$_2$)$_{12}$CH$_3$,

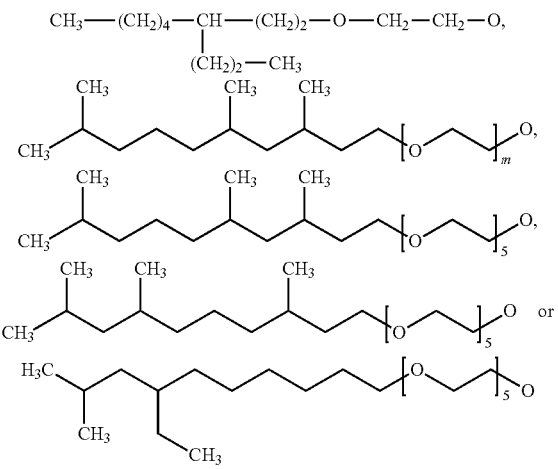

The average branching number of the carbon chain $R^6$ can be from 1 to 5, preferably from 1.2 to 4. The average branching number is defined here as the number of CH$_3$ groups-1.

$R^3$ can be $CH_2$, $CH_2CH_2$, $CH_2CH_2CH_2$, $CH_2CH_2CH_2CH_2$, $CH(CH_3)$, $CH_2CH(CH_3)$, $CH(CH_3)CH_2$, $C(CH_3)_2$, $CH(C_2H_5)$, $CH_2CH_2CH(CH_3)$, $CH_2CH(CH_3)CH_2$ or

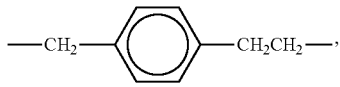

The mercaptosilane-wax mixture can comprise a mixture of different mercaptosilanes of the general formula I and optionally of condensates of these.

The mixture of different mercaptosilanes of the general formula I can comprise mercaptosilanes of the general formula I having various m values.

The mixture of different mercaptosilanes of the general formula I can comprise mercaptosilanes of the general formula I having various $R^6$ groups. The $R^6$ groups here can have different C-atom-chain lengths.

The mixture of different mercaptosilanes of the general formula I can comprise different mercaptosilanes of the general formula I having various R and $R^2$ groups where the $R^1$ and $R^2$ groups are composed of alkoxy and alkyl polyether groups.

The mixture of different mercaptosilanes of the general formula I can comprise different mercaptosilanes of the general formula I having different $R^2$.

The mixture of different mercaptosilanes of the general formula I can comprise different mercaptosilanes of the general formula I having various $R^1$ and $R^2$ groups where the $R^1$ groups are composed of alkyl polyether groups and the $R^2$ groups are composed of ethoxy groups and $R^6$ has an alkyl-chain length of 13 C atoms, $R^5$ is ethylene and m is on average 5.

The mixture of different mercaptosilanes of the general formula I can comprise different mercaptosilanes of the general formula I where $R^2$ is identical or different and is an ethoxy or alkyl polyether group ($R^1$), $R^6$ has an alkyl-chain length of 13 C atoms, $R^5$ is ethylene and m is on average 5, and $R^2$ is different.

The mixture of different mercaptosilanes of the general formula I can comprise different mercaptosilanes of the general formula I where $R^1$ and $R^2$ are alkoxy and alkyl polyether groups and $R^6$ is composed of different C-atom-chain lengths.

The mixture of different mercaptosilanes of the general formula I can comprise different mercaptosilanes of the general formula I where $R^2$ is identical or different and is an alkoxy or alkyl polyether group ($R^1$), and $R^2$ in the mixture is different, and $R^6$ is composed of different C-atom-chain lengths.

The mixture of different mercaptosilanes of the general formula I can preferably comprise

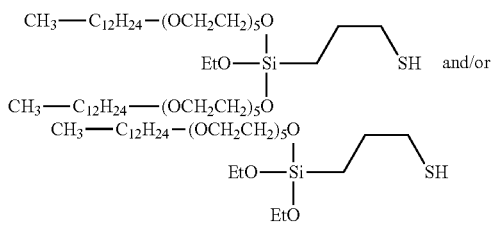

and optionally products of the hydrolysis and/or condensation of the abovementioned compounds.

From the mercaptosilanes of the formula I it is easily possible via water addition and optionally additive addition to form condensates, i.e. oligo- and polysiloxanes.

These oligomeric or polymeric siloxanes of the compounds of the formula I can be used as coupling reagents for the same applications as the monomeric compounds of the formula I.

The mercaptosilane compounds can also take the form of mixture of the oligomeric or polymeric siloxanes of mercaptosilanes of the general formula I or take the form of mixtures of mercaptosilanes of the general formula I with mixtures of the oligomeric or polymeric siloxanes of mercaptosilanes of the general formula I.

The invention further provides a process for the production of the plastics-covered mercaptosilane-wax mixtures of the invention, the said process being characterized in that in a first step a mercaptosilane-wax mixture is obtained through mixing of at least one mercaptosilane of the general formula I with at least one wax, preferably a paraffinic wax, particularly preferably a mixture of different paraffinic waxes, with particular preference a mixture of n and iso paraffinic waxes with congealing point from 30 to 160° C., preferably from 40 to 130° C., particularly preferably from 60 to 80° C., and in a second step the mercaptosilane-wax mixture from the first step is charged to a plastics sachet, where the plastic of the sachet is selected from the group of polypropylene, polyethylene, preferably LDPE, ethylene-vinyl acetate copolymer and mixtures of the abovementioned plastics with melting point from 70 to 170° C., preferably from 85 to 140° C., particularly preferably from 100 to 120° C., and the plastics sachet is sealed.

The plastics sachet can comprise >90% by weight of plastic, preferably ≥95% by weight, particularly preferably >97% by weight. The plastics sachet can be composed of polypropylene, polyethylene, preferably LDPE, ethylene-vinyl acetate copolymer or a mixture of the abovementioned plastics.

The process of the invention can be carried out continuously or batchwise.

The ratio by weight of mercaptosilane of the general formula I to wax can be from 10:90 to 95:5, preferably from 80:20 to 85:15.

In the first step of the process of the invention the mercaptosilane-wax mixture can be produced at temperatures of from 30 to 160° C., preferably from 40 to 130° C., particularly preferably from 60 to 80° C.

In the second step of the process of the invention the mercaptosilane-wax mixture can be charged to the plastics sachet at a temperature of from 30 to 160° C., preferably from 40 to 130° C., particularly preferably from 60 to 80° C.

For the avoidance of condensation reactions the production of the mercaptosilane-wax mixture and/or the charging of material to the plastics sachets can take place in an anhydrous environment, particularly preferably in an inert gas atmosphere.

The process of the invention can be carried out at atmospheric pressure.

A temperature-controllable kneading, stirring or mixing assembly can be used to mix the mercaptosilane of the general formula I with the wax in the first step of the process of the invention. Use of this kneading, stirring or mixing assembly can achieve uniform motion of, and mixing of, the product.

A parameter frequently used for the classification of commercially available mixers here is the Froude number (Fr), which gives the ratio of centrifugal acceleration to gravitational acceleration.

It is possible to use not only low-speed mixers where Fr<1, for example tumbling mixers or displacement mixers, but also high-speed mixers where Fr>1, for example impeller mixers, and also centrifugal mixers where Fr>>1. Examples of a low-speed displacement mixer that can be used are drum mixers (for example from Engelsmann) and twin-shaft mixers (for example from Gericke or Forberg). Examples of high-speed mixers that can be used for the region where Fr>1 are ploughshare mixers (for example from Lödige) and vertical twin-shaft mixers (for example from Amixon). In the region where Fr>>1 it is possible to use centrifugal or intensive mixers (for example from Eirich or Mixaco).

The temperature during the mixing process here can be above the congealing point of the wax. The wax can be introduced in liquid form into the mixer, for example by means of nozzles, after prior melting.

The plastics sachets can be sealed by welding, heat sealing, cold sealing, ultrasound sealing or sealing with closure clip (e.g. made of plastic).

The plastics-covered mercaptosilane-wax mixture of the invention can also comprise fillers, preferably silicas or carbon black, and also other rubber auxiliaries, for example reaction accelerators, antioxidants, heat stabilizers, light stabilizers, antiozonants, processing aids, plasticizers, tackifiers, blowing agents, dyes, pigments, waxes, extenders, organic acids, retarders, metal oxides, and also activators, for example triethanolamine, polyethylene glycol, and/or hexanetriol. These compounds are known in the rubber industry. Specifically these can by way of example be— where the following substances do not restrict the invention or the information provided above: substituted phenols, aromatic amines, e.g. phenylenediamine derivatives, sterically hindered amines, e.g. 2,2,4-trimethyl-1,2-dihydroquinoline, metal salts, silanes, long-chain carboxylic acids, fatty acids, zinc salts, zinc soaps or resins.

The plastics-covered mercaptosilane-wax mixture of the invention can be used as coupling agent between inorganic materials, for example glass fibres, metals, oxidic fillers, or silicas, and organic polymers, for example thermosets, thermoplastics or elastomers, or as crosslinking agent and surface modifier. The plastics-covered mercaptosilane-wax mixture of the invention can be used as coupling reagent in rubber mixtures, for example tyre treads.

The invention further provides a rubber mixture comprising
(A) at least one rubber,
(B) at least one filler, preferably precipitated silica, and
(C) at least one plastics-covered mercaptosilane-wax mixture of the invention.

Rubber used can be natural rubber and/or synthetic rubbers. Preferred synthetic rubbers are described, for example, in W. Hofmann, Kautschuktechnologie [Rubber Technology], Genter Verlag, Stuttgart 1980. They can be inter alia
    polybutadiene (BR);
    polyisoprene (IR)
styrene/butadiene copolymers, for example emulsion SBR (E-SBR) or solution SBR (S-SBR), preferably having styrene contents of from 1 to 60% by weight, particularly from 5 to 50% by weight (SBR),
    chloroprene (CR);
    isobutylene/isoprene copolymers (IIR)
    butadiene/acrylonitrile copolymers having acrylonitrile contents of 5 to 60%, preferably 10 to 50%, by weight (NBR)
    partly hydrogenated or fully hydrogenated NBR rubber (HNBR);
    ethylene/propylene/diene copolymers (EPDM);
    abovementioned rubbers which also have functional groups, e.g. carboxy, silanol, amino, mercapto or epoxy groups, for example epoxidized NR, carboxy-functionalized NBR or silanol (—SiOH)— or siloxy (—Si—OR)-functionalized SBR,
or else a mixture of these rubbers.

In a preferred embodiment, the rubbers can be sulphur-vulcanizable. Production of car tyre treads can in particular use anionically polymerized S-SBRs (solution SBRs) with glass transition temperature above −50° C., or else a mixture of these with diene rubbers. It is particularly preferably possible to use S-SBR rubbers whose butadiene portion has more than 20% by weight vinyl fraction. It is very particularly preferably possible to use S-SBR rubbers whose butadiene portion has more than 50% by weight vinyl fraction.

It is preferably possible to use mixtures of the abovementioned rubbers which have more than 50% by weight, particularly more than 60% by weight, S-SBR content.

The following fillers can be used as fillers for the rubber mixture of the invention:
    carbon blacks: The carbon blacks to be used here are those produced by the lamp-black, furnace, gas-black or thermal process, having BET surface areas of from 20 to 200 m$^2$/g. The carbon blacks can optionally also comprise heteroatoms, for example Si.
    Amorphous silicas, produced for example by precipitation from solutions of silicates or by flame hydrolysis of silicon halides with specific surface areas of from 5 to 1000 m$^2$/g, preferably from 20 to 400 m$^2$/g (BET surface area) and with primary particle sizes of from 10 to 400 nm. The silicas may optionally also take the form of mixed oxides with other metal oxides, for example Al oxides, Mg oxides, Ca oxides, Ba oxides, Zn oxides and titanium oxides.
    Synthetic silicates, for example aluminium silicate, alkaline earth metal silicates such as magnesium silicate or calcium silicate, having BET surface areas of from 20 to 400 m$^2$/g and primary particle diameters of from 10 to 400 nm.
    Synthetic or natural aluminium oxides and, respectively, aluminium hydroxides.
    Natural silicates, for example kaolin and other naturally occurring silicas.
    Glass fibres and glass-fibre products (mats, strands) or glass microbeads.

It is preferably possible to use quantities of from 5 to 150 parts by weight, based in each case on 100 parts of rubber, of amorphous silicas produced by precipitation from solutions of silicates, having BET surface areas of from 20 to 400 m$^2$/g, particularly from 100 m$^2$/g to 250 m$^2$/g.

The fillers mentioned can be used alone or in a mixture.

The rubber mixture can comprise from 5 to 150 parts by weight of filler (B) and from 0.1 to 35 parts by weight, preferably from 2 to 20 parts by weight, particularly preferably from 5 to 20 parts by weight, of plastics-covered mercaptosilane-wax mixture (C) of the invention, where the parts by weight are based on 100 parts by weight of rubber.

The rubber mixture can also comprise silicone oil and/or alkylsilane.

The rubber mixture of the invention can comprise other known rubber auxiliaries, e.g. crosslinking agents, vulcanization accelerators, reaction accelerators, reaction retarders, antioxidants, stabilizers, processing aids, plasticizers, waxes or metal oxides, and also optionally activators such as triethanolamine, polyethylene glycol or hexanetriol.

The quantities used of the rubber auxiliaries can be conventional, depending inter alia on the intended use. Conventional quantities can by way of example be amounts of from 0.1 to 50% by weight, based on rubber.

Sulphur or organic sulphur donors can be used as crosslinking agents.

The rubber mixture of the invention can comprise other vulcanization accelerators. Examples of suitable vulcanization accelerators that can be used are mercaptobenzothiazoles, suiphenamides, guanidines, dithiocarbamates, thioureas, thiocarbonates, and also zinc salts of these, for example zinc dibutyldithiocarbamate.

The rubber mixture of the invention can preferably also comprise
(D) a thiuram sulphide accelerator and/or carbamate accelerator and/or the corresponding zinc salts,
(E) a nitrogen-containing co-activator,
(F) optionally other rubber auxiliaries and
(G) optionally other accelerators,
where the ratio by weight of accelerator (D) to nitrogen-containing co-activator (E) is equal to or greater than 1.

The rubber mixture of the invention can comprise at least 0.25 part by weight, based on 100 parts by weight of rubber, of (D) tetrabenzylthiuram disulphide or tetramethylthiuram disulphide, at most 0.25 part by weight, based on 100 parts by weight of rubber, of (E) diphenylguanidine, and more parts by weight than (D) of (G) cyclohexyl- or dicyclohexylsulphenamide.

It is preferably possible to use sulphenamides together with guanidines and thiurams, particularly cyclohexylsulphenamide or dicylohexylsulphenamide together with diphenylguanidine and tetrabenzylthiuram disulphide or tetramethylthiuram disulphide.

Quantities that can be used of the vulcanization accelerators and sulphur are from 0.1 to 10% by weight, preferably from 0.1 to 5% by weight, based on the rubber used. It is particularly preferably possible to use quantities of from 1 to 4% by weight of sulphur and sulphenamides, quantities of from 0.2 to 1% by weight of thiurams and quantities of from 0 to 0.5% by weight of guanidines.

The rubber mixtures of the invention can be produced by mixing, in a mixing assembly, at least one rubber (A), at least one filler (B), at least one plastics-covered mercaptosilane-wax mixture (C) of the invention, and optionally other rubber auxiliaries.

The mixing of the rubbers with the filler, optionally rubber auxiliaries, and the plastics-covered mercaptosilane-wax mixture of the invention can be carried out in/on conventional mixing assemblies, for example rolls, internal mixers and mixing extruders. Rubber mixtures of this type can usually be produced in internal mixers by first, in one or more successive thermomechanical mixing stages at from 100 to 170° C., mixing to incorporate the rubbers, the filler, the plastics-covered mercaptosilane-wax mixture of the invention and the rubber auxiliaries. The addition sequence and the juncture of addition of the individual components here can have a decisive effect on the properties obtained from the mixture. It is usually possible to admix the crosslinking chemicals with the resultant rubber mixture in an internal mixer or on a roll at from 40 to 110° C. and to process the mixture to give what is known as the crude mixture for the subsequent steps of processing, for example shaping and vulcanization.

The rubber mixture of the invention can be vulcanized at temperatures of 80 to 200° C., preferably 110 to 180° C., optionally under a pressure of 10 to 200 bar.

The rubber mixture of the invention can be used for the production of mouldings, for example for the production of pneumatic and other tyres, tyre treads, cable sheathing, hoses, drive belts, conveyor belts, roll coverings, shoe soles, sealing elements, for example sealing rings, and damping elements.

Mouldings can be produced by vulcanization from the rubber mixtures of the invention.

The plastics-covered mercaptosilane-wax mixture of the invention has the advantage that the monomer content of the mercaptosilane undergoes no significant change even during prolonged storage.

Another advantage is good processability and handling properties.

EXAMPLES

Example 1: (Shelf Life of Plastics Sachet with and without Wax)

Comparative Example 1

1. Flat sachet made of unmodified LDPE, dimensions: 170 mm×300 mm (L×W), thickness: 100 µm from neoLab Migge Laborbedarf-Vertriebs GmbH, Germany.
2. VP Si 363 silane from Evonik Industries AG.

500 g of VP Si 363 is charged under inert conditions (MB 150-GII glovebox from MBraun Inertgas-Systeme GmbH, Germany) to flat polymer sachets, and commercially available film-welding equipment from Braukmann GmbH, Germany (Caso® VC10 Vakuumierer) is used for the welding process.

Inventive Example 1

1. Flat sachet made of unmodified LDPE, dimensions: 170 mm×300 mm (L×W), thickness: 100 µm from neoLab Migge Laborbedarf-Vertriebs GnmbH, Germany.
2. Protektor G3108 from Paramelt (composition: mixture of refined hydrocarbon waxes, congealing point ≈57° C., relative density ≈from 0.89 to 0.96 g/cm$^3$ (20° C.), viscosity ≈4 mPas (100° C.).
3. VP Si 363 silane from Evonik Industries AG.

The mercaptosilane-wax mixture is produced by melting Protektor G3108 in the presence of VP Si 363 in a ratio by weight of 1:5 in a 1000 mL glass beaker on a hotplate with stirrer motor at 65° C. under inert conditions (glovebox from MBraun Inertgas-Systeme GmbH, Germany (MB 150-GII)). 500 g of the liquid, homogeneous, warm physical mixture of Protektor G3108 and VP Si 363 is then charged under inert conditions (glovebox from MBraun Inertgas-Systeme GmbH, Germany (MB 150-GII)) to flat polymer sachets; commercially available film-welding equipment from Braukmann GmbH, Germany (Caso® VC10 Vakuumierer) is used for the welding process, and the material is allowed to cool at room temperature for hardening.

The samples are stored uncovered in aluminium dishes for 3 months at 23° C. and 50% humidity.

The shelf life of the samples is evaluated on the basis of the remaining content of VP Si 363 monomer in comparison with oligomeric structures by using $^{29}$Si NMR measurements. The results are shown in Table 1.

The $^{29}$Si NMR measurements are made in a 500 MHz "Bruker Avance 500" from Bruker with nitrogen-cooled cryohead (about 2000 scans). For preparation of the samples of the silane/wax mixture, about 0.5 g of the sample is added to a Brand culture tube with screw closure, from 3 to 4 mL of $CDCl_3$ and $Cr(acac)_3$ are added, and the mixture is treated three times for 15 minutes in a Panasonic 470/H Ultrasound bath. It is then centrifuged and also filtered. An NMR spectrum of the solution is then recorded.

TABLE 1

|  | Monomer content [mol %] prior to storage | Monomer content [mol %] after storage |
| --- | --- | --- |
| Comparative Example 1 | 99 | 73 |
| Inventive Example 1: | 97 | 96 |

Ageing effects are greatly suppressed by the combination of LDPE film and Protektor wax when comparison is made with the wax-free Comparative Example 1.

Example 2: (Shelf Life with Wax with and without Film; Comparison of Film Thicknesses)

Comparative Example 2

Materials Used:
1. FLB flat sachet from Polymersynthesewerk GmbH, melting point: 104° C., thickness: 60 μm.
Polymer: Exxonmobil LD 362 BR produced by A. Schulman GmbH, based on an LDPE/EVA copolymer (vinyl acetate content: 4.5% by weight, density: 0.928 g/cm$^3$, melt flow rate (190° C./2.16 kg): 2.0 g/10 min).
2. Protektor G3108 from Paramelt (composition: mixture of refined hydrocarbon waxes, congealing point ≈57° C., relative density ≈0.89-0.96 g/cm$^3$ (20° C.), viscosity ≈4 mPas (100° C.).
3. VP Si 363 silane from Evonik Industries AG.

The mixtures are produced by melting Protektor G3108 and VP Si 363 together in a ratio by weight of 1:5 in a 1000 mL glass beaker on a hotplate with stirrer motor at 65° C. under inert conditions (glovebox from MBraun Inertgas-Systeme GmbH, Germany (MB 150-GII)). 500 g of the liquid, homogeneous, warm physical mixture of Protektor G3108 and VP Si 363 is then charged under inert conditions (glovebox from MBraun Inertgas-Systeme GmbH, Germany (MB 150-GII)) to flat polymer sachets; commercially available film-welding equipment from Braukmann GmbH, Germany (Caso® VC10 Vakuumierer) is used for the welding process, and the material is allowed to cool at room temperature for hardening. The sachet is removed prior to the storage study.

Comparative Example 3

Materials Used:
1. FLB flat sachet from Polymersynthesewerk GmbH, melting point: 104° C., thickness: 60 μm
Polymer: Exxonmobil LD 362 BR produced by A. Schulman GmbH, based on an LDPE/EVA copolymer (vinyl acetate content: 4.5% by weight, density: 0.928 g/cm$^3$, melt flow rate (190° C./2.16 kg): 2.0 g/10 min)
2. Protektor G3108 from Paramelt (composition: mixture of refined hydrocarbon waxes, congealing point ≈57° C., relative density ≈0.89-0.96 g/cm$^3$ (20° C.), viscosity ≈4 mPas (100° C.).
3. VP Si 363 silane from Evonik Industries AG.

The mixtures are produced by melting Protektor G3108 and VP Si 363 together in a ratio by weight of 1:5 in a 1000 mL glass beaker on a hotplate with stirrer motor at 65° C. under inert conditions (glovebox from MBraun Inertgas-Systeme GmbH, Germany (MB 150-GII)). 500 g of the liquid, homogeneous, warm physical mixture of Protektor G3108 and VP Si 363 is then charged under inert conditions (glovebox from MBraun Inertgas-Systeme GmbH, Germany (MB 150-GII)) to flat polymer sachets; commercially available film-welding equipment from Braukmann GmbH, Germany (Caso® VC10 Vakuumierer) is used for the welding process, and the material is allowed to cool at room temperature for hardening.

Comparative Example 4

Production of the Comparative Example according to the mercaptosilane carbon-black mixture of the invention in Example 1 of WO2013149790.

Inventive Example 2

Materials Used:
1. FLB flat sachet, Antist/Slip/EVA, from Polymersynthesewerk GmbH, antiblock: 1000 ppm, slip: 750 ppm, heat stabilizers, dimensions: 600 mm×900 mm (W×L), melting point: 104° C., weight per metre unfilled: 167 g, thickness: 150 μm
Polymer: Exxonmobil LD 362 BR produced by A. Schulman GmbH, based on an LDPE/EVA copolymer (vinyl acetate content: 4.5% by weight, density: 0.928 g/cm$^3$, melt flow rate (190° C./2.16 kg): 2.0 g/10 min)
Additive (antistatic agent): Polybatch VLA 55 produced by A. Schulman GmbH (additive content: 5% by weight, carrier material: PE, melt flow rate: 20 g/10 min, density: 0.96 g/m$^3$, bulk density: 550 g/l, moisture content: <1500 ppm.
2. Wax: Protektor G3108 from Paramelt (composition: mixture of refined hydrocarbon waxes, congealing point ≈57° C., relative density≈0.89-0.96 g/cm$^3$ (20° C.), viscosity≈4 mPas (100° C.)).
3. VP Si 363 silane from Evonik Industries AG.

The mixtures are produced by melting Protektor G3108 and VP Si 363 together in a ratio by weight of 1:5 in a 1000 mL glass beaker on a hotplate with stirrer motor at 65° C. under inert conditions (glovebox from MBraun Inertgas-Systeme GmbH, Germany (MB 150-GII)). 500 g of the liquid, homogeneous, warm physical mixture of Protektor G3108 and VP Si 363 is then charged under inert conditions (glovebox from MBraun Inertgas-Systeme GmbH, Germany (MB 150-GII)) to flat polymer sachets; commercially available film-welding equipment from Braukmann GmbH, Germany (Caso® VC10 Vakuumierer) is used for the welding process, and the material is allowed to cool at room temperature for hardening.

Inventive Example 3

Materials Used:
1. FLB flat sachet, Antist/Slip/EVA, from Polymersynthesewerk GmbH, antiblock: 1000 ppm, slip: 750 ppm, heat stabilizers, dimensions: 600 mm×900 mm (W×L), melting point: 104° C., weight per metre unfilled: 167 g, thickness: 150 μm Polymer: Exxonmobil LD 362 BR produced by A. Schulman GmbH, based on an LDPE/EVA copolymer (vinyl acetate content: 4.5% by weight, density: 0.928 g/cm, melt flow rate: 2.0 g/10 min)

Additive (antistatic agent): Polybatch VLA 55 produced by A. Schulman GmbH (additive content: 5% by weight, carrier material: PE, melt flow rate: 20 g/10 min, density: 0.96 g/m$^3$, bulk density: 550 g/l, moisture content: <1500 ppm.

2. Wax: Varazon 5998 from Sasol (composition: mixture of paraffin waxes and hydrocarbon waxes from 50 to 100%, coagulation range a from 64 to 68° C.).

3. VP Si 363 silane from Evonik Industries AG.

The mixtures are produced by melting Varazon 5998 and VP Si 363 together in a ratio by weight of 1:5 in a 1000 mL glass beaker on a hotplate with stirrer motor at 75° C. under inert conditions (glovebox from MBraun Inertgas-Systeme GmbH, Germany (MB 150-GII)). 500 g of the liquid, homogeneous, warm physical mixture of Varazon 5998 and VP Si 363 is then charged under inert conditions (glovebox from MBraun Inertgas-Systeme GmbH, Germany (MB 150-GII)) to flat polymer sachets; commercially available film-welding equipment from Braukmann GmbH, Germany (Caso® VC10 Vakuumierer) is used for the welding process, and the material is allowed to cool at room temperature for hardening.

For accelerated ageing, the samples are stored uncovered in aluminium dishes in a drying cabinet for 7 days at 60° C.

The shelf life of the samples is evaluated on the basis of the remaining content of VP Si 363 monomer in comparison with oligomeric structures by using $^{29}$Si NMR measurements. The results are shown in Table 2.

The $^{29}$Si NMR measurements are made in a 500 MHz "Bruker Avance 500" from Bruker with nitrogen-cooled cryohead (about 2000 scans). For preparation of the samples of the silane/wax mixture and, respectively, silane carbon black mixture, about 0.5 g of the sample is added to a Brand culture tube with screw closure, from 3 to 4 mL of CDCl$_3$ and Cr(acac)$_3$ are added, and the mixture is treated three times for 15 minutes in a Panasonic 470/H ultrasound bath. It is then centrifuged and also filtered. An NMR spectrum of the solution is then recorded.

TABLE 2

|  | Monomer content [mol %] prior to storage | Monomer content [mol %] after storage |
|---|---|---|
| Comparative Example 2 | 97 | 87 |
| Comparative Example 3 | 97 | Sachet unstable |
| Comparative Example 4 | 98 | <5% |
| Inventive Example 2: | 97 | 95 |
| Inventive Example 3: | 97 | 96 |

The results show that the sachet markedly increases shelf life when comparison is made with the uncovered wax-silane mixtures. Inventive Examples 2 and 3 with film thicknesses of 150 μm lead to greater stability in comparison with Comparative Example 3, in which the sachet burst during storage. There is also a significant improvement of shelf life in comparison with the carbon-black-based Comparative Example 4.

Example 3: (Comparison of Carbon Black and Wax/Sachet as Carrier)

The formulation used for the rubber mixtures is specified in Table 3 below. The unit phr here means parts by weight based on 100 parts of the crude rubber used. Each of the rubber mixtures uses an equimolecular quantity of VP Si 363 silane.

TABLE 3

| Substance | Quantity [phr] | Quantity [phr] | Quantity [phr] |
|---|---|---|---|
| 1st stage | Ref. rubber mixture I | Ref. Rubber mixture II | Inv. Rubber mixture III |
| Buna VSL 5025-2 | 96.25 | 96.25 | 96.25 |
| Buna CB 24 | 30 | 30 | 30 |
| ULTRASIL 7000 GR | 80 | 80 | 80 |
| Corax ® N 330 | 5 | — | 5 |
| ZnO RS | 2 | 2 | 2 |
| Edenor ST1 | 1 | 1 | 1 |
| Vivatec 500 | 8.75 | 8.75 | 8.75 |
| Protector G 3108 | 2 | 2 | 2 |
| Vulkanox 4020/LG | 2 | 2 | 2 |
| Vulkanox-HS/LG | 1.5 | 1.5 | 1.5 |
| VP Si 363 ® | 9 | — | — |
| Comparative Example 4 | — | 18 | — |
| Inventive Example 3 | — | — | 10.80 |
| 2nd Stage Stage 1 batch |  |  |  |
| 3rd stage Stage 2 batch |  |  |  |
| Perkacit TBzTD | 0.4 | 0.4 | 0.4 |
| Vulkacit CZ/EG-C | 1.6 | 1.6 | 1.6 |
| Sulphur | 2.0 | 2.0 | 2.0 |

The polymer VSL 5025-2 is a solution-polymerized SBR copolymer from Lanxess AG, with 25% by weight styrene content and with 50% by weight vinyl fraction. The copolymer comprises 37.5 phr of TDAE oil and its Mooney viscosity (ML 1+4/100° C.) is 47 MU.

The polymer Buna CB 24 is a high-cis-1,4-polybutadiene (neodymium type) from Lanxess AG, with at least 96% cis-1,4 content and with Mooney viscosity of 44+5 MU.

Ultrasil 7000 GR is a readily dispersible silica from Evonik Industries AG with BET surface area of 170 m$^2$/g.

The carbon black Corax N 330 is from Orion Engineered Carbons GmbH. Vivatec 500 from H&R AG is used as TDAE oil, Vulkanox 4020/LG is 6PPD from Rhein Chemie Rheinau GmbH, Vulkanox HS/LG is TMQ from Rhein Chemie Rheinau GmbH and Protektor G3108 is an antiozonant wax from Paramelt B.V., ZnO RS is ZnO from Arnsperger Chemikalien GmbH, EDENOR ST1 GS 2.0 is palmitic-stearic acid from Caldic Deutschland Chemie B.V. and Vulkacit CZ/EG-C is CBS from Chemie Rheinau GmbH. TBzTD was purchased via Weber & Schaer (producer: Dalian Richon).

The mixtures were produced in three stages in a 1.5 l internal mixer (E type) with batch temperature 155° C. according to the mixing specification described in Table 4.

TABLE 4

| Stage 1 | |
|---|---|
| Settings | |
| Mixing assembly | from HF Mixing Group GmbH; type GK 1,5 E |
| Fill level | 0.65 |

TABLE 4-continued

| | |
|---|---|
| Rotation rate | 70 min$^{-1}$ |
| Ram pressure | 5.5 bar |
| Chamber temp. | 70° C. |
| Mixing procedure | |
| 0 to 0.5 min | Buna VSL 5025-2 + Buna CB 24 |
| 0.5 min | TMQ, 6PPD |
| 0.5 to 1 min | Mix |
| 1 to 2 min | ½ ULTRASIL 7000 GR, silane or silane on HS 45 or plastics-covered mercaptosilane-wax mixture, ZnO, stearic acid |
| 2 min | Purge and ventilate |
| 2 to 3 min | Carbon black, Vivatec 500, ½ ULTRASIL 7000 GR, Protector G3108 |
| 3 min | Purge and ventilate |
| 3 to 5 min | Mix at 155° C. |
| 5 min | Discharge and form milled sheet on laboratory roll mill for 45 s (Laboratory roll mill: diameter 250 mm, length 190 mm, gap between rolls 4 mm, roll temperature 60° C.) 24 h at room temperature |
| | Stage 2 |
| Settings | |
| Mixing assembly | as in stage 1 except |
| Fill level | 0.62 |
| Mixing procedure | |
| 0 to 0.5 min | Break up stage 1 batch |
| 0.5 to 3 min | Mix at 155° C. |
| 3 min | Discharge and form milled sheet on laboratory roll mill for 45 s (Laboratory roll mill: diameter 250 mm, length 190 mm, gap between rolls 4 mm, roll temperature 60° C.) 4 h at room temperature |
| | Stage 3 |
| Settings | |
| Mixing assembly | as in stage 1 except |
| Fill level | 0.59 |
| Rotation rate | 50 min$^{-1}$ |
| Chamber temp. | 50° C. |
| Mixing procedure | |
| 0 to 0.5 min | Break up stage 2 batch |
| 0.5 to 2 min | Accelerator and sulphur, mix at 100° C. |
| 2 min | Discharge and form milled sheet on laboratory roll mill for 20 s, and within a further 40 s: cut the material and fold it over 3* towards the left and 3* towards the right, and roll the material 3* with narrow roll gap (3 mm) and draw off milled sheet. (Laboratory roll mill: diameter 250 mm, length 190 mm, gap between rolls from 3 to 4 mm, roll temperature 80° C.) |
| Batch temp. | 100° C. |

The general process for the production of rubber mixtures and vulcanizates of these is described in "Rubber Technology Handbook", W. Hofmann, Hanser Verlag 1994.

Table 5 gives the rubber testing methods used.

Vulcanization takes place at a temperature of 165° C. for a period of 8 minutes in a typical vulcanization press with a retention pressure of 120 bar. Table 6 gives the data for crude mixture and vulcanizate.

TABLE 5

| Physical testing | Standard/conditions |
|---|---|
| Mooney viscosity ML 1 + 4 at 100° C. Mooney viscosity/MU | ISO 289-1 |
| Rheovulcameter measurements at 100° C. | |
| Volume after 30 s/mm³ Apparent shear rate/s$^{-1}$ Apparent viscosity/Pa s | Rheo-Vulkameter 78.90 (Gottfert Werkstoff-Prufmaschinen GmbH) Nozzle 2 mm × 10 mm test pressure 40 bar, preheat time 60 s |
| Tensile test on specimen at 23° C. Reinforcement index: 300% modulus/50% modulus | ISO 37 |
| Shore A hardness at 23° C. Shore A hardness/SH | ISO 7619-1 |
| Ball rebound, 23° C. and 70° C. Rebound resilience/% | DIN EN ISO 8307 Drop height 500 mm, steel ball d = 19 mm, 28 g |
| Viscoelastic properties of vulcanizate at 60° C. Maximum loss factor tan δ | Rubber Process Analyser RPA 2000 (Alpha Technologies), Strain Sweep, 1.7 Hz, 0.28%-42% elongation; see "Operators Manual RPA 2000" from Alpha Technologies, Feb. 1997 |
| Viscoelastic properties at 60° C. Loss factor tan δ | ISO 4664-1 16 Hz, 50 N initial force and 25 N amplitude force, 5 min temperature-adjustment time, measured value recorded after 30 s of test time |

TABLE 6

| | Ref. rubber mixture I | Ref. rubber mixture II | Inv. rubber mixture III |
|---|---|---|---|
| Crude mixture results: Mooney viscosity ML 1 + 4 at 100° C. Mooney viscosity/MU | | | |
| 1st stage | 129 | 129 | 120 |
| 2nd Stage | 80 | 82 | 78 |
| 3rd stage | 54 | 55 | 53 |
| Rheovulcameter measurements at 100° C. Volume after 30 s/mm³ | | | |
| 1st stage | 413 | 548 | 577 |
| 2nd stage | 1067 | 1010 | 1125 |
| 3rd stage | 2058 | 1933 | 2201 |
| Apparent shear rate/s$^{-1}$ | | | |
| 1st stage | 18.2 | 24.6 | 26.5 |
| 2nd stage | 47.4 | 45.0 | 49.2 |
| 3rd stage | 91.1 | 82.9 | 95.1 |

TABLE 6-continued

|  | Ref. rubber mixture I | Ref. rubber mixture II | Inv. rubber mixture III |
|---|---|---|---|
| Apparent viscosity/Pa s |  |  |  |
| 1st stage | 16 234 | 12 021 | 11 141 |
| 2nd stage | 6229 | 6570 | 6010 |
| 3rd stage | 3244 | 3564 | 3106 |
| Vulcanizate results: Tensile test on specimen at 23° C. Reinforcement index |  |  |  |
| 300%/50% modulus | 10.2 | 10.5 | 11.0 |
| Shore A hardness/SH | 55 | 56 | 55 |
| Ball rebound |  |  |  |
| Rebound resilience at 23° C./% | 43.6 | 43.1 | 43.4 |
| Rebound resilience at 70° C./% | 72.3 | 71.5 | 74.6 |
| Difference: Rebound res. 70° C. − rebound res. 23° C./% | 28.7 | 28.4 | 31.2 |
| Viscoelastic properties, 60° C. Rubber Process Analyser (RPA), Strain Sweep, 1.7 Hz, 0.28%-42% elongation |  |  |  |
| Maximum loss factor tan δ/— | 0.116 | 0.114 | 0.104 |
| Viscoelastic properties at 60° C., 16 Hz, 50 N initial force, 25 N amplitude force |  |  |  |
| Loss factor tan δ/— | 0.094 | 0.093 | 0.090 |

In comparison with Comparative Mixture I with VP Si 363 alone and Comparative Mixture II according to WO2013149790, the rubber mixture III of the invention exhibits improved processing behaviour (in all three mixing stages lower Mooney and apparent viscosities, higher shear rates, and also volumes after 30 s), improved reinforcement behaviour (higher reinforcement index), improved rolling resistance (lower tan δ values at 60° C., higher rebound resilience at 60° C.) and better realization of the trade-off between wet skid and rolling resistance (difference between rebound resilience values at 70° C. and at 23° C.).

The invention claimed is:

1. A sealed plastics-covered mercaptosilane-wax mixture, comprising a plastics covering, selected from the group consisting of polypropylene, polyethylene, ethylene-vinyl acetate copolymer, and mixtures of the above mentioned plastics with melting point from 70 to 170° C., and mercaptosilane-wax mixture comprises at least one mercaptosilane, a monomer, of the general formula I

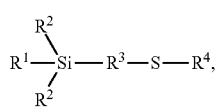

where $R^1$ is an alkyl polyether group $—O—(R^5—O)_m—R^6$, where $R^5$ is identical or different and is a branched or unbranched, saturated or unsaturated, aliphatic divalent C1-C30 hydrocarbon group, m is on average from 1 to 30, and $R^6$ is composed of at least 1 C atom and is an unsubstituted or substituted, branched or unbranched monovalent alkyl, alkenyl, aryl or aralkyl group, $R^2$ is identical or different and is an $R^1$, C1-C12-alkyl or $R^7O$ group, where $R^7$ is H, methyl, ethyl, propyl, C9-C30 branched or unbranched monovalent alkyl, alkenyl, aryl, or aralkyl group or $(R^8)_3Si$ group, where $R^8$ is C1-C30 branched or unbranched alkyl or alkenyl group, $R^3$ is a branched or unbranched, saturated or unsaturated, aliphatic, aromatic or mixed aliphatic/aromatic divalent C1-C30 hydrocarbon group and $R^4$ is H, CN or (C=O)—$R^9$, where $R^9$ is a branched or unbranched, saturated or unsaturated, aliphatic, aromatic or mixed aliphatic/aromatic monovalent C1-C30 hydrocarbon group, and at least one wax with congealing point from 30 to 160° C., wherein the plastics-covering has a thickness of the plastics covering is from 10 to 3000 μm and is a sachet and the mercaptosilane-wax mixture has a ratio by weight of mercaptosilane of general formula I to wax from 10:90 to 95:5 and, wherein the plastic has an average molar mass of the plastic of the plastics covering is from 50 000 to 1 000 000 g/mol.

2. The plastics-covered mercaptosilane-wax mixture according to claim 1, wherein the mercaptosilane-wax mixture comprises a mixture of mercaptosilanes of the general formula I.

3. The plastics-covered mercaptosilane-wax mixture according to claim 2, wherein the mixture of mercaptosilanes of the general formula (I) comprises and,

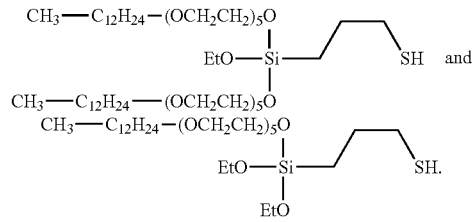

4. A process for the production of the sealed plastics-covered mercaptosilane-wax mixture according to claim 1, comprising mixing of at least one mercaptosilane of the general formula I with at least one wax with congealing point from 30 to 160° C. to form a mercaptosilane-wax mixture having a ratio by weight of mercaptosilane of general formula I to wax from 55:45 to 90:10, and charging the mercaptosilane-wax mixture to a plastics sachet, where the plastic of the sachet is selected from the group of polypropylene, polyethylene, ethylene-vinyl acetate copolymer and mixtures of the abovementioned plastics with melting point from 70 to 170° C., and sealing the plastics sachet.

5. The process according to claim 4, wherein mixing includes a process involving a temperature-controllable kneading, stirring, or mixing assembly.

6. The process according to claim 4, wherein mixing occurs at temperatures of from 30 to 160° C.

7. The process according to claim 4, wherein charging takes place at temperatures of from 30 to 160° C.

8. A method for the production of rubber mixtures comprising: introducing the plastics-covered mercaptosilane-wax mixture according to claim 1 to a mixture having at least one rubber.

9. A rubber mixture comprising:
(A) at least one rubber,
(B) at least one filler, and
(C) at least one sealed plastics-covered mercaptosilane-wax mixture according to claim 1.

* * * * *